(12) United States Patent
Ducoulombier

(10) Patent No.: US 11,514,428 B2
(45) Date of Patent: Nov. 29, 2022

(54) DEVICE FOR LAUNCHING MULTIPLE PEER TO PEER CASHLESS PAYMENT APPLICATIONS ON MOBILE DEVICES

(71) Applicant: Slip Cash Inc., Newport Beach, CA (US)

(72) Inventor: Sergio Nicolas Ducoulombier, Newport Beach, CA (US)

(*) Notice: Subject to any disclaimer, the term of this patent is extended or adjusted under 35 U.S.C. 154(b) by 0 days.

(21) Appl. No.: 16/925,290

(22) Filed: Jul. 9, 2020

(65) Prior Publication Data
US 2021/0012318 A1 Jan. 14, 2021

Related U.S. Application Data

(60) Provisional application No. 62/899,747, filed on Sep. 13, 2019, provisional application No. 62/872,516, filed on Jul. 10, 2019.

(51) Int. Cl.
*G06Q 20/32* (2012.01)
*G06Q 20/22* (2012.01)
(Continued)

(52) U.S. Cl.
CPC ..... *G06Q 20/3278* (2013.01); *G06K 7/10297* (2013.01); *G06Q 20/0655* (2013.01); *G06Q 20/108* (2013.01); *G06Q 20/127* (2013.01); *G06Q 20/223* (2013.01); *G06Q 20/326* (2020.05); *G06Q 20/3223* (2013.01); *G06Q 20/3678* (2013.01); *G06Q 20/4014* (2013.01); *G06Q 40/02* (2013.01);
(Continued)

(58) Field of Classification Search
CPC ............ G06Q 20/3278; G06Q 20/326; G06Q 20/0655; H04M 1/72454; G06K 7/10297
See application file for complete search history.

(56) References Cited

U.S. PATENT DOCUMENTS

| 7,873,573 B2 * | 1/2011 | Realini | G06Q 40/00 705/37 |
| 8,249,965 B2 * | 8/2012 | Tumminaro | G06Q 20/12 705/40 |

(Continued)

FOREIGN PATENT DOCUMENTS

| EP | 2407919 A | * | 3/2007 | ............. G06Q 20/00 |
| JP | 4469376 | * | 2/2017 | ............. G06Q 20/02 |

*Primary Examiner* — Daniel S Felten
(74) *Attorney, Agent, or Firm* — Makoui Law, PC; Ali Makoui

(57) ABSTRACT

A device includes one or more NFC chips that are preprogrammed to provide a payee's identification and information for launching any of several P2P cashless payment applications to which the payee is subscribed, to a mobile phone of a payor. When a mobile device of a payor is brought to the vicinity of an NFC chip of the device, the mobile device launches a corresponding P2P cashless payment application. The P2P cashless payment application shows the payee's information and the payor may proceed to make a payment to the payee. The device may include an NFC chip that is preprogrammed to provide the payee's identification and the information for launching a single application on the mobile device of the payor to display the P2P cashless payment applications to which the payee is subscribed. The payor may then proceed to make a payment to the payee using the payor's mobile device.

8 Claims, 28 Drawing Sheets

(51) Int. Cl.

| | | |
|---|---|---|
| *G06Q 20/12* | (2012.01) | |
| *G06Q 20/40* | (2012.01) | |
| *G06Q 20/10* | (2012.01) | |
| *G06Q 20/06* | (2012.01) | |
| *G06Q 20/36* | (2012.01) | |
| *G06K 7/10* | (2006.01) | |
| *H04W 4/80* | (2018.01) | |
| *G06Q 40/02* | (2012.01) | |
| *H04M 1/72454* | (2021.01) | |

(52) U.S. Cl.
CPC ......... *H04M 1/72454* (2021.01); *H04W 4/80* (2018.02); *G06Q 2220/00* (2013.01)

(56) References Cited

U.S. PATENT DOCUMENTS

| | | | |
|---|---|---|---|
| 8,799,084 B2 | 8/2014 | Florek et al. | |
| 8,977,569 B2 * | 3/2015 | Rao | G06K 19/07707 705/41 |
| 10,332,087 B2 * | 6/2019 | Florek | G06Q 20/3574 |
| 2006/0186209 A1 * | 8/2006 | Narendra | G06K 19/0703 235/492 |
| 2009/0094126 A1 * | 4/2009 | Killian | G06Q 40/02 705/17 |
| 2011/0264543 A1 * | 10/2011 | Taveau | G06Q 20/32 705/23 |
| 2011/0282753 A1 * | 11/2011 | Mullen | G06Q 20/385 705/14.73 |
| 2012/0078783 A1 * | 3/2012 | Park | G06Q 20/105 705/41 |
| 2014/0365374 A1 * | 12/2014 | Baldwin | G06Q 20/354 705/65 |
| 2015/0363377 A1 * | 12/2015 | Dojo | G06Q 10/063 715/224 |
| 2016/0071089 A1 * | 3/2016 | Boivie | G06Q 20/326 705/73 |
| 2017/0061736 A1 * | 3/2017 | Lutnick | G06Q 30/0209 |
| 2017/0244437 A1 | 8/2017 | Alieri | |
| 2018/0041859 A1 | 2/2018 | Forster | |

* cited by examiner

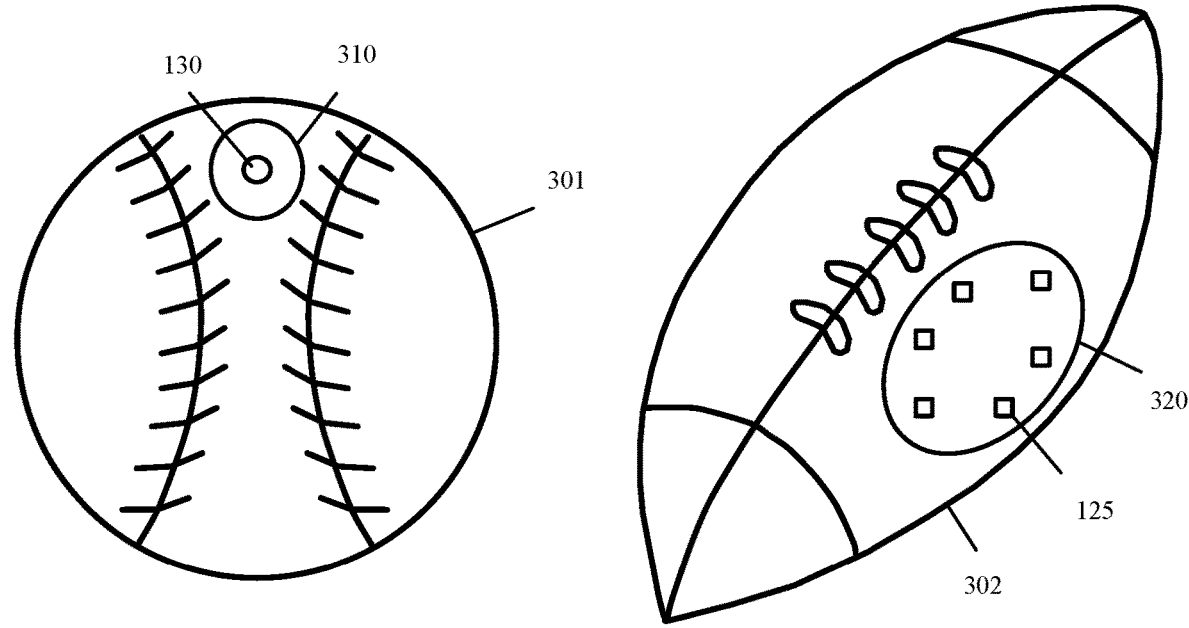
FIG. 3A  FIG. 3B
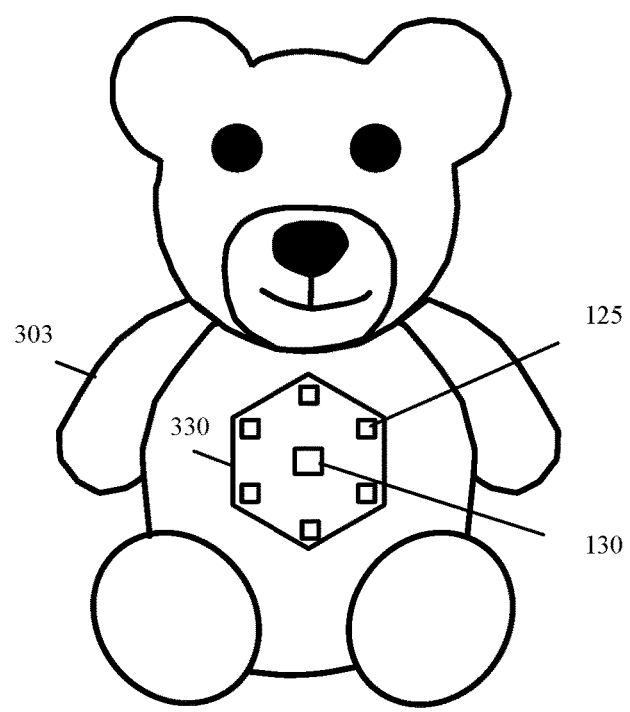
FIG. 3C

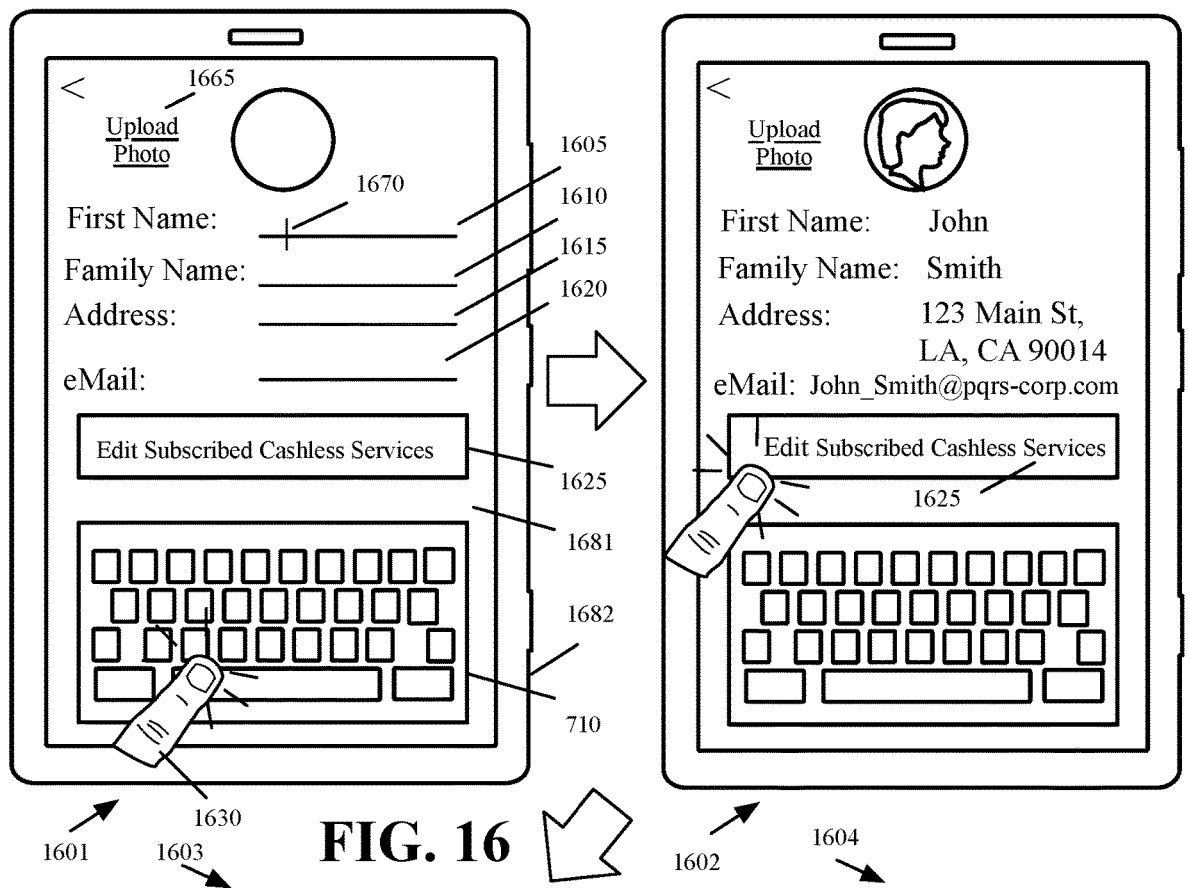
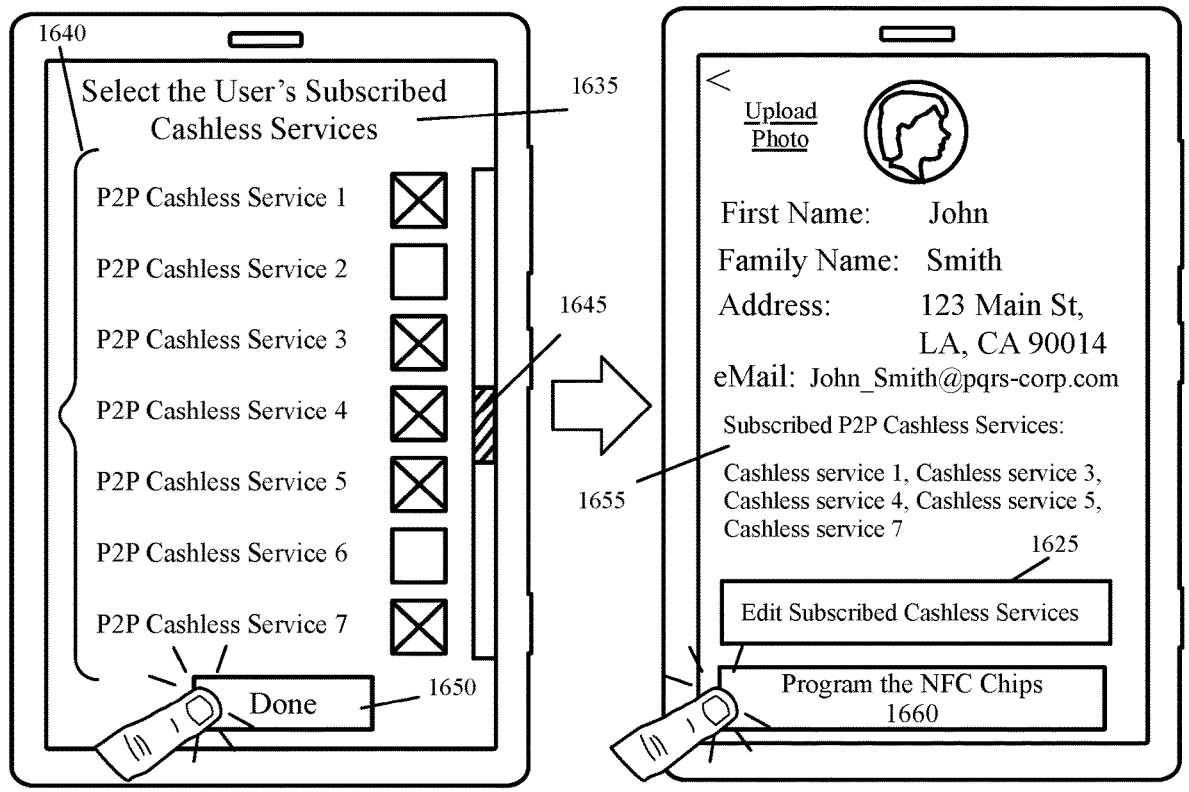
FIG. 16

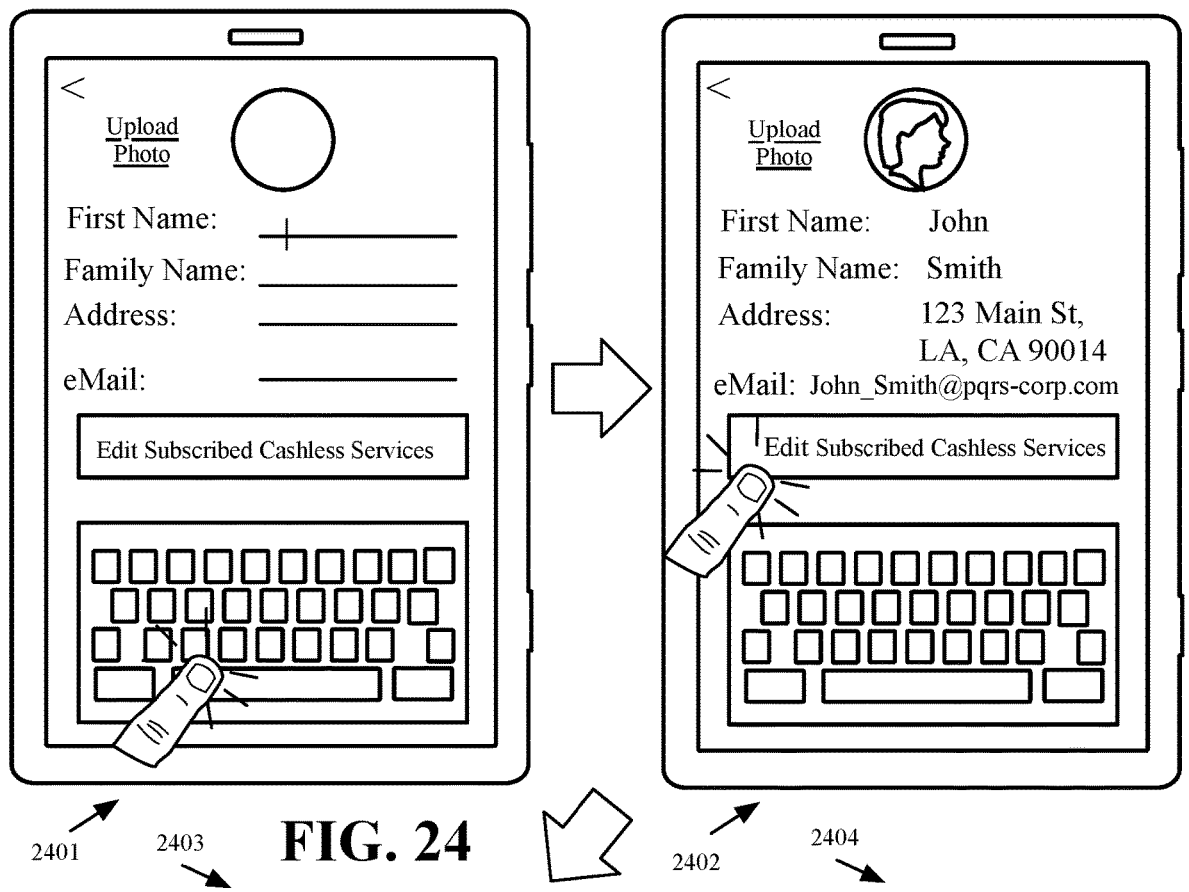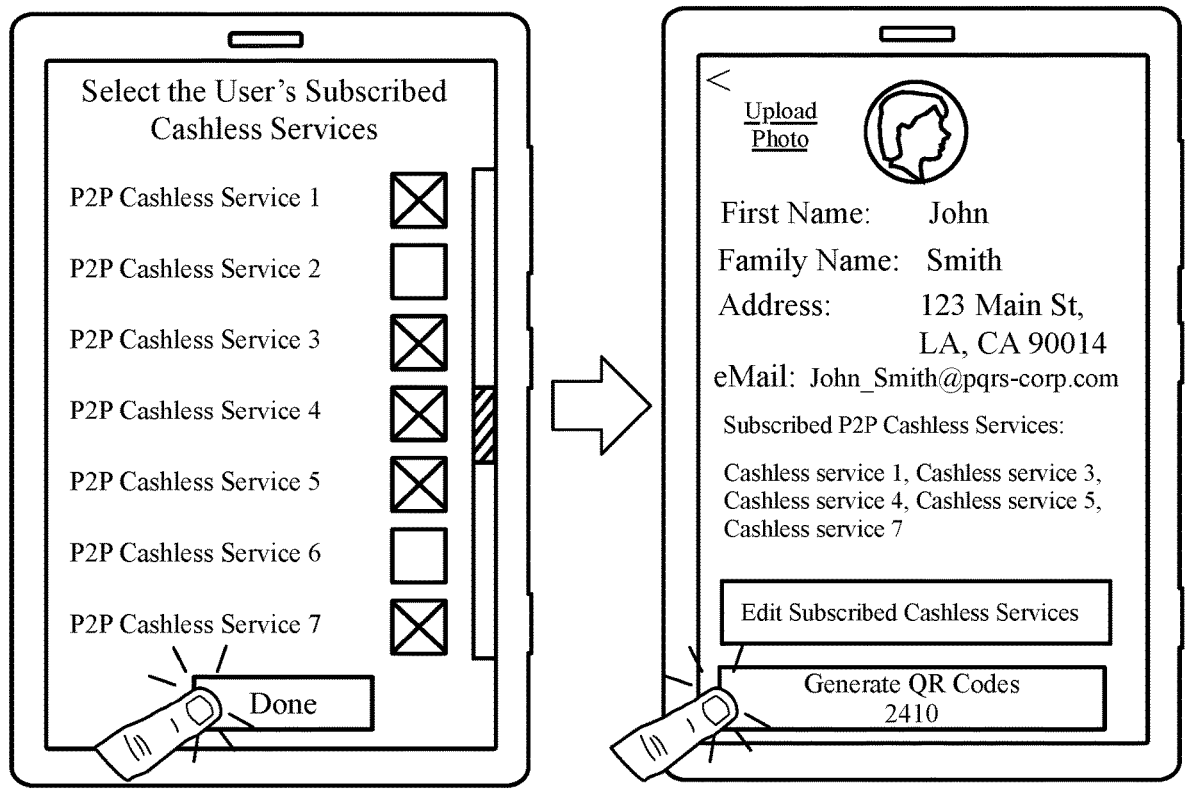
FIG. 24

| Daily Activity | Monthly Summary | Year to Date |

P2P Cashless Service Selection Application

Daily Activity — Dashboard

| P2P Cashless Payment Application 2610 | Received 2620 | Sent 2625 | Pending Balance 2630 |
|---|---|---|---|
| Pay Pal | $20.00 | $1.00 | $19.00 |
| Square Cash App | $50.00 | $20.00 | $30.00 |
| Venmo | $100.00 | $80.00 | $20.00 |
| Facebook Messanger | $200.00 | $0.00 | $200.00 |
| Apple Cash | $321.35 | $20.00 | $301.35 |
| Google Pay Cash | $10.00 | $1.00 | $9.00 |

FIG. 26

DEVICE FOR LAUNCHING MULTIPLE PEER TO PEER CASHLESS PAYMENT APPLICATIONS ON MOBILE DEVICES

CLAIM OF BENEFIT TO PRIOR APPLICATIONS

This application claims the benefit of U.S. Provisional Patent Application Ser. No. 62/872,516, filed on Jul. 10, 2019 and U.S. Provisional Patent Application Ser. No. 62/899,747, filed on Sep. 13, 2019. The contents of U.S. Provisional Patent Application No. 62/872,516 and U.S. Provisional Patent Application No. 62/899,747 are hereby incorporated by reference.

BACKGROUND

Peer to peer (P2P) cashless payments are electronic transactions that allow the transfer of funds between two parties using their bank accounts using a mobile or online application associated with a P2P platform. A person may sign up to a P2P platform by choosing a username and password, providing identification, and linking a bank account to it. In order to make a payment through a P2P system, both parties have to be registered to the same P2P platform and the payor has to identify the payee by the username, email, phone number, etc., in order to initiate the transfer.

Unless the parties have dealt with each other before, information has to be exchanged to determine a P2P platform to which both parties are subscribed and at least the payee's profile information. Such information has to be either exchanged verbally or by sending text messages or emails. In addition, the payee has to be present, or has to be contacted by the payor, in order to know that the payor wants to make a payment in order to provide the payee's profile information. When two persons perform a P2P electronic transaction, the P2P application that is used by both persons records the transaction and either transfers money directly between the two persons' bank accounts or between their accounts within the application.

BRIEF DESCRIPTION OF THE DRAWINGS

The various embodiments of the present device for launching multiple peer to peer cashless payment applications on mobile devices now will be discussed in detail with an emphasis on highlighting the advantageous features. These embodiments depict the novel and non-obvious device for launching multiple peer to peer cashless payment applications on mobile devices shown in the accompanying drawings, which are for illustrative purposes only. These drawings include the following figures, in which like numerals indicate like parts:

FIG. 3A is a front elevation view of an example embodiment of a throwable object with an application launder for launching a mobile application for selecting one of several cashless payment methods, according to various aspects of the present disclosure;

FIG. 3B is a front perspective view of an example embodiment of a throwable object with several application launchers for launching different cashless payment methods, according to various aspects of the present disclosure;

FIG. 3C is a front elevation view of an example embodiment of a throwable object with several application launchers for launching different cashless payment methods and application launcher for launching a mobile application for selecting one of several cashless payment methods, according to various aspects of the present disclosure;

FIG. 16 is a schematic front view of an example user interface of a system for programming a device for launching multiple P2P cashless payment applications, according to various aspects of the present disclosure;

FIG. 24 is a schematic front view of an example user interface of a system for generating one or more QR codes for launching multiple P2P cashless payment applications, according to various aspects of the present disclosure;

FIG. 26 is a schematic front view of an example user interface of the P2P cashless payment selection application for providing reports of a payee's activities, according to various aspects of the present disclosure.

DETAILED DESCRIPTION

Figure 1A:
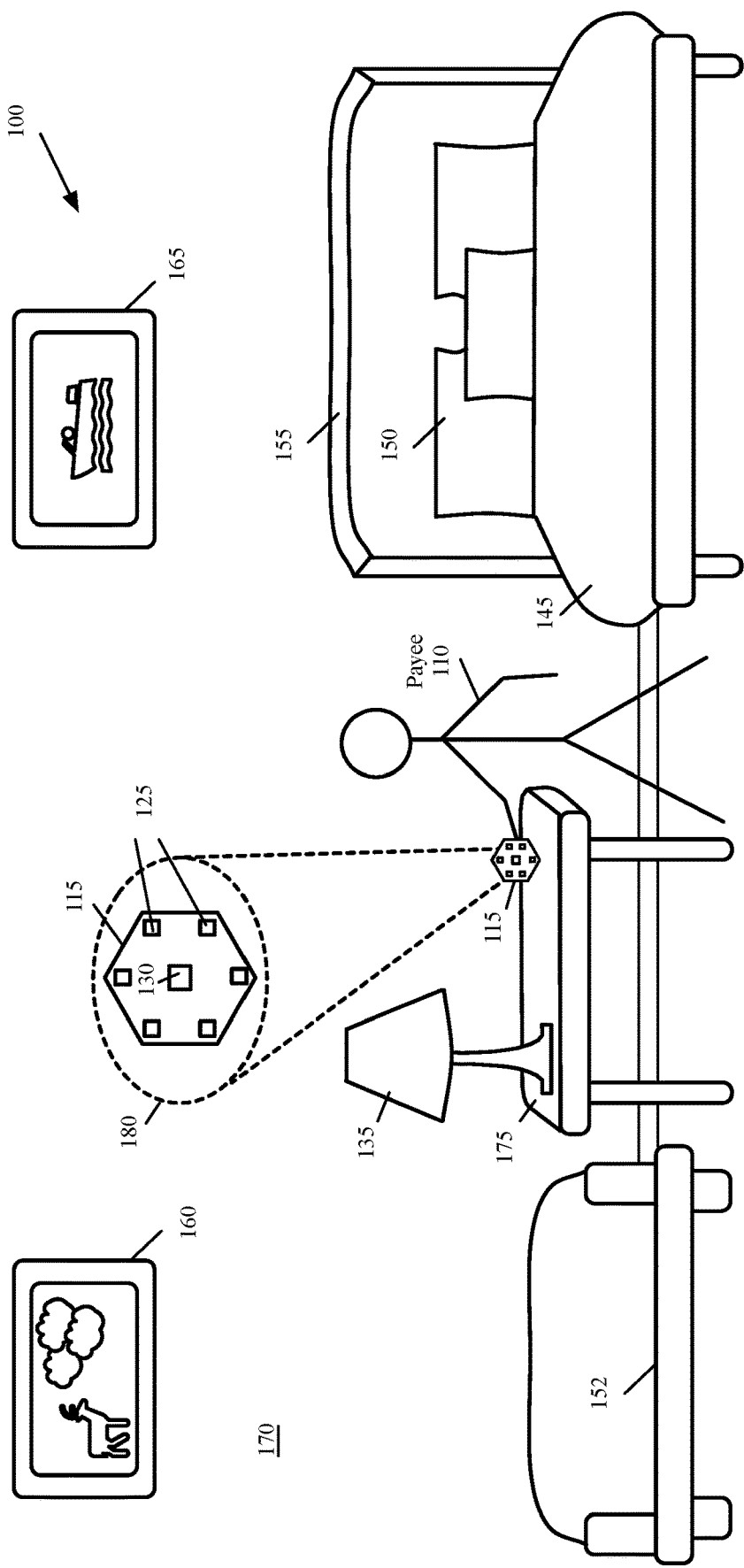
FIG. 1A is a functional block diagram illustrating an example of a portable device that may be placed in different locations for launching any one of multiple P2P cashless payment applications on a mobile device, according to various aspects of the present disclosure.

One aspect of the present embodiments includes the realization that sending and receiving money through a P2P cashless payment application require a time-consuming, multiple step process for exchanging data between the parties from their personal account profiles. The data has to be publicly exchanged, either verbally or by sending text or email messages that may not be secure. Both parties to the money transfer have to communicate to each other the means for transferring and exchanging their personal information such as their name, phone number, and/or email.

In addition, the parties have to communicate to each other to choose a P2P cashless payment application to which both parties are subscribed. If one of the individuals is not subscribed to that application, the parties have to either communicate again to find another P2P cashless payment application to which both parties are registered, or one of the individuals has to take the time to download the corresponding application into the individual's mobile device and set up an account in order to accomplish their objective of sending or receiving money from a P2P cashless payment application. After getting the personal information of the payee, the payor has to search the agreed upon cashless payment application to find the identification of the payee and make the payment.

The present embodiments, as described in detail below, solve the above-mentioned problems by providing a device that is preprogrammed to provide the information for launching any of several P2P cashless payment applications to which a payee is subscribed, to a mobile phone of a payor. The device may also be preprogrammed to provide the payee's identification to the mobile device of the payor.

Since the device is preprogrammed with the payee's information, once a P2P cashless payment application to which the payee is subscribed is launched on the payor's mobile device, the P2P cashless payment application may show the payee's information on the mobile device and the payor may quickly proceed to make a payment to the payee.

In some embodiments, the device may be preprogrammed to provide the information for launching a single application on the mobile device of the payor to display the P2P cashless payment applications to which the payee is subscribed in order to allow the payor to select a P2P cashless payment application to which the payor is also subscribed. The device may also be preprogrammed to provide the payee's identification to the mobile device of the payor to allow the payee to be identified to a selected P2P cashless payment application. The payor may then quickly proceed to make a payment to the payee using the payor's mobile device.

Having a device that enables one to accept and access multiple P2P cashless payment applications increases the chance to have a peer or stranger to send or request money without friction, difficulty, or publicly sharing of personal information. Since there are multiple P2P cashless applications, this device increases the probability of achieving the objective of a successful cashless transaction by integrating and consolidating the use of all such services with minimal effort on the part of both the payor and the payee. The device also removes any chance of accidentally sending money to an unintended or wrong person.

The remaining detailed description describes the present embodiments with reference to the drawings. In the drawings, reference numbers label elements of the present embodiments. These reference numbers are reproduced below in connection with the discussion of the corresponding drawing features.

Some of the present embodiments provide a device that is capable of launching one of multiple P2P cashless payment applications to which both of the parties of an electronic payment transaction are registered. FIG. 1A is a functional block diagram illustrating an example of a portable device 115 that may be placed in different locations for launching any one of multiple P2P cashless payment applications on a mobile device, according to various aspects of the present disclosure. The device 115 is herein referred to as the multiple P2P cashless payment applications launcher device.

With reference to FIG. 1A, further details of the device 115 is shown in the expanded view 180. The device 115 may include several P2P cashless payment application launchers 125. Each P2P cashless payment application launcher may include a near field communication (NFC) chip that is preprogrammed with the identification of a specific P2P cashless payment application to be launched on a mobile device. The NFC chip may also be preprogrammed to pass the preprogrammed identification of the payee, who is associated with (e.g., has purchased, leased, or been assigned) the device 115, to the launched cashless payment application. The identification of a specific P2P cashless payment application, in some embodiments, may be an address such as, for example, and without limitations, a uniform resource identifier (URI) address, a uniform resource locator (URL) address or web address, etc., used by the mobile device to launch the specific P2P cashless payment application.

The P2P cashless payment applications, in some embodiments, may be third-party applications. Some of the P2P cashless payment applications may be activated by pointing to a URL address by a web browser. Some of the P2P cashless payment applications may include a client application that is installed on the mobile device and may be activated to communicate with a remote server to perform a cashless payment transaction.

The identification of the payee may include any information that may be used by the launched P2P cashless payment application to identify the payee as an account holder of the launched P2P cashless payment application. The identification of the payee may include, for example, and without limitations, one or more of the payee's user identification, the payee's picture, the payee's phone number, the payee's email, the payee's first and/or family name, the payee's title, the payee's place of business, etc. Different P2P cashless payment applications may require different types of identifications.

The NFC is a short-range wireless connectivity standard that uses magnetic field induction to enable communication between devices that are brought within a close proximity (e.g., within 4 centimeters or less) of each other. Example of such NFC chips may include, without limitation, a 13.56 MHz NTAG® 213x NFC microchip.

An NFC chip may include non-transitory, non-volatile read-writable storage, such as, for example, and without limitation random access memory (RAM), erasable programmable read-only memories (EPROMs), electrically erasable programmable read-only memories (EEPROMs), flash memory, magnetic memory, etc. The NFC chip and an associated antenna are sometimes referred to as an NFC tag. The NFC chips may be incorporated in mobile devices such as mobile phones, tables, laptops, etc.

When a mobile device with an NFC chip is brought to within a short distance (e.g., 4 cm or less) of one of the NFC chips of the device 115, the NFC chip of the mobile device may generate a magnetic field which may induce an electric current in the antenna of the NFC chip of the device 115. The NFC chip of the device 115 may act as a transponder and may modulate the data stored on the NFC chip (e.g., the identification of the application to be launched on the mobile device and the identification of the payee) in a magnetic field and inductively couple this magnetic field to the mobile device's NFC chip. The multiple P2P cashless payment applications launcher device, in some embodiments, may lack a permanent source of power such as a battery, a power supply, and/or wires to connect to an external power source.

In the example of FIG. 1A, each NFC chip 125 may be clearly marked to identify the particular P2P cashless payment application that is launched by the chip. The person 110 may be a service provider such as, for example, and without limitation, a person providing room, maid, housekeeping, or janitorial service, room or meal service, a porter, a concierge, a steward, a warden, a doorperson, a watchperson, a bell captain, a manager, a custodian, a curator, an overseer, etc. The person 110 may be providing the service, without limitation, in a hospitality place such as a hotel, a motel, a hostel, a dorm, or similar establishments. The person 110 may leave the multiple P2P cashless payment applications launcher device 115 at a place such as, for example, and without limitation, a room, a hallway, a lobby, etc., where the person provides service.

The device 115 may be left, for example and without limitation, at a table 175, on a bed 145, on a bedrest 155, on a pillow 150, on a sofa or a chair 152, etc. The device 115 may be attached (e.g., by using a two-sided tape or glue) to, for example, and without limitations, a photo frame 160-165, a wall 170, a lampshade 135, etc. The device 115 may also be used to sell an item. For example, the device 115 may be attached to a painting on the wall, to a bath robe, to pillows, to a TV, to a soap dish, to a chair, etc., which may be for sale.

Other examples of the use of the device 115 may be, for example, and without limitations, to place the device 115 at a restaurant, at a gas pump, inside a waiter/waitresses' bill fold, on a gambling machines such as slot machines, at a nail salon, at a barbershop, at a massage parlor, on a bulletin board, on a message board, on a tip jar, on a piggy bank, on a payment box, on the back of a headrest on a car seat, on a bus seat, on an airplane seat, or on a train seat, on the back of a seat in a movie theater or in a stadium or in a place of worship, on a vase, on a tray, etc. The device 115 may be, without limitations, in the shape of a pad, a coaster, an elastic band, a plaque, a signage, a keychain, a throwable object such as a ball, a toy, or a beanbag, a tip jar, a keychain, a piggy back, a throwable object, etc. The payee using the device 115 may be any person or entity that provides a service or sells an item.

Figure 1B:
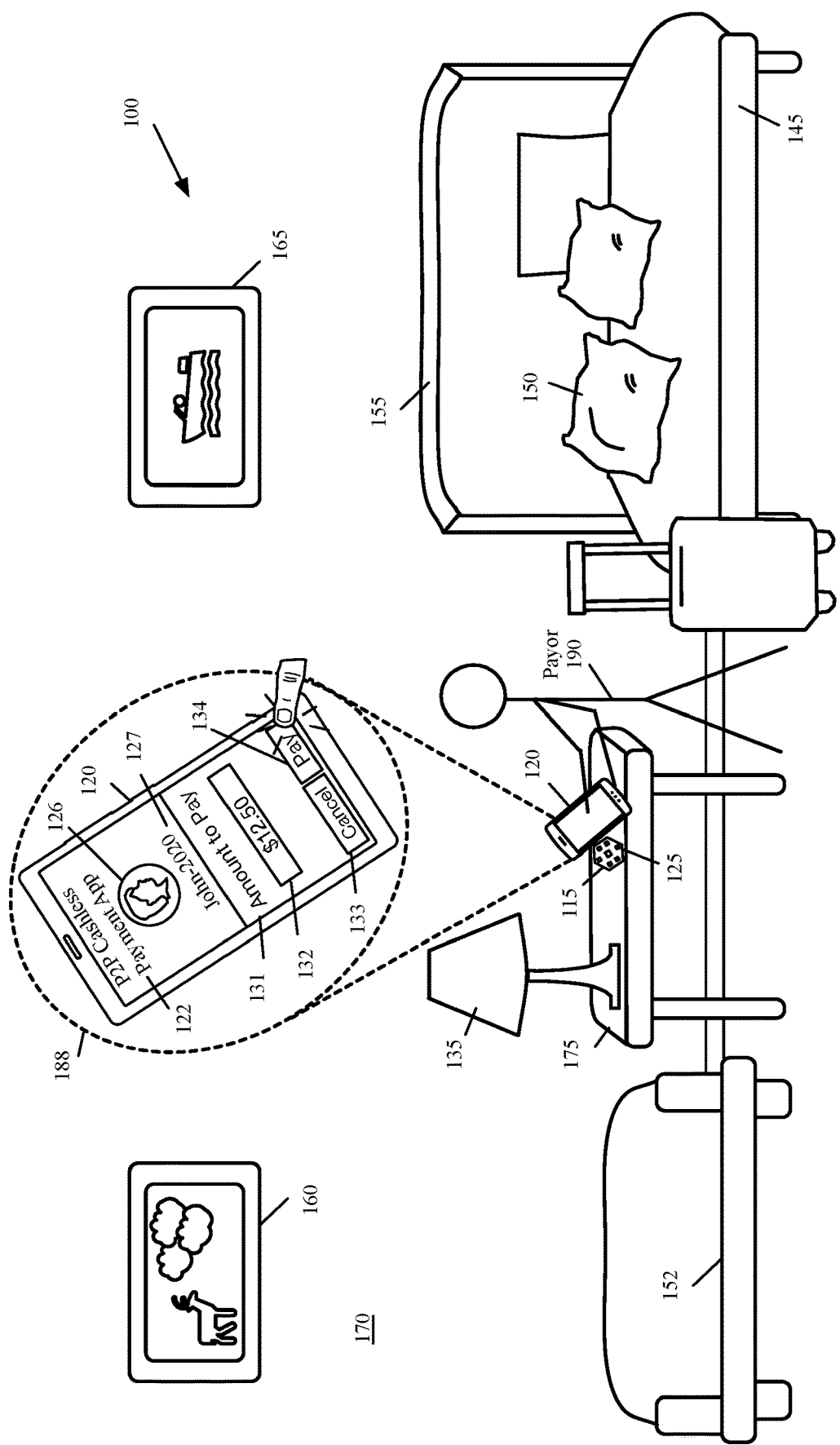
FIG. 1B is a functional block diagram illustrating a payor using the multiple P2P cashless payment applications launcher device of FIG. 1A to make a P2P payment through one of the P2P cashless payment applications, according to various aspects of the present disclosure.

A person who may have received services from the person 110 may then bring a mobile device such as, without limitation, a smartphone, a personal digital assistant (PDA), a tablet computer, a laptop computer, etc., to the proximity of one of the NFC chips 125 on the device 115 in order to launch the corresponding P2P cashless payment application on the mobile device. FIG. 1B is a functional block diagram illustrating a payor using the multiple P2P cashless payment applications launcher device of FIG. 1A to make a P2P payment through one of the P2P cashless payment applications, according to various aspects of the present disclosure.

With reference to FIG. 1B, the person 190 may be a person who has used the services of the payee 100 (FIG. 1A) and/or has purchased an item from the payee 100. The person 190 may bring a mobile device 120 to the vicinity of one of the NFC chips 125 of the device 115 to make a payment. Since the NFC chip 125 is preprogrammed with the payment information for the person 110 and the identification of a particular P2P cashless payment application, the NFC chip of the mobile devices may receive the preprogrammed information of the NFC chip and may launch the particular P2P cashless payment application.

As shown by the expanded view 188, the particular P2P cashless payment application 122 that is associated with the selected NFC chip 125 may be launched on the mobile device 120. The P2P cashless payment application 122 may display the identification of the payee. The identification of the payee may include, for example, and without limitations, one or more of the payee's user identification 127, the payee's picture 126, the payee's phone number, the payee's email, the payee's first and/or family name, the payee's title, the payee's place of business, etc.

The payor 190 may then use the launched application to enter an amount 132 to pay make a payment to the person 110. The payor 190 may make a P2P cashless payment by selecting the option 136 or by selecting the cancel option 133. With further reference to FIGS. 1A and 1B, the payee 110 may not be present when the payor 190 makes the P2P cashless payment to the payee 110.

With reference to FIG. 1A, the device 115, in some aspects of the present embodiments, may include an application launcher 130 that may launch a P2P cashless service selection application on a mobile device that comes to the proximity of the application launcher 130. The application launcher 130, in some embodiments, may be an NFC chip. The P2P cashless service selection application launched by the NFC chip 130 may present a plurality of cashless payment applications to which the person 110 is subscribed. The payor, on whose mobile device the application is launched, may then select one of the applications to make a payment to the person 110.

Figure 1C:
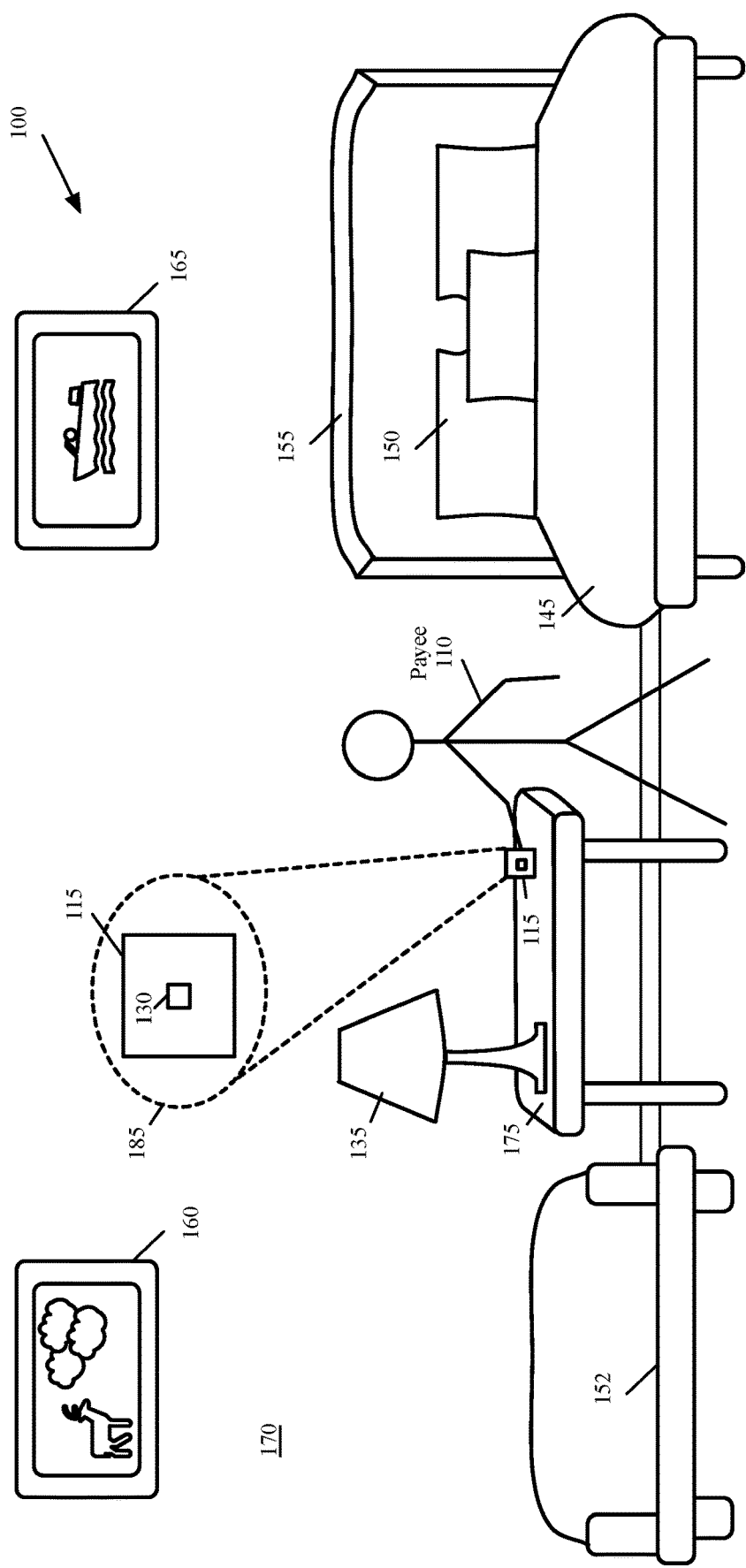
FIG. 1C is a functional block diagram illustrating an example of a portable device that may include an application launcher to launch a P2P cashless service selection application for presenting a plurality of P2P cashless payment applications on a mobile device, according to various aspects of the present disclosure.

Some embodiments may only include the P2P cashless service selection application launcher 130 and may not include an individual P2P cashless payment application launcher 125 for each specific cashless payment application. FIG. 1C is a functional block diagram illustrating an example of a portable device 115 that may include an application launcher 130 to launch a P2P cashless service selection application for presenting a plurality of P2P cashless payment applications on a mobile device, according to various aspects of the present disclosure.

With reference to FIG. 1C, as shown in the expanded view 185, the portable device 115 of FIG. 1B may only include the application launcher 130 that may launch a P2P cashless service selection application 140, which is described below with reference to FIG. 1D. Unlike the portable device 115 of FIG. 1A, the portable device 115 of FIG. 1C may not include the application launchers 125 for each individual P2P cashless payment application.

Figure 1D:
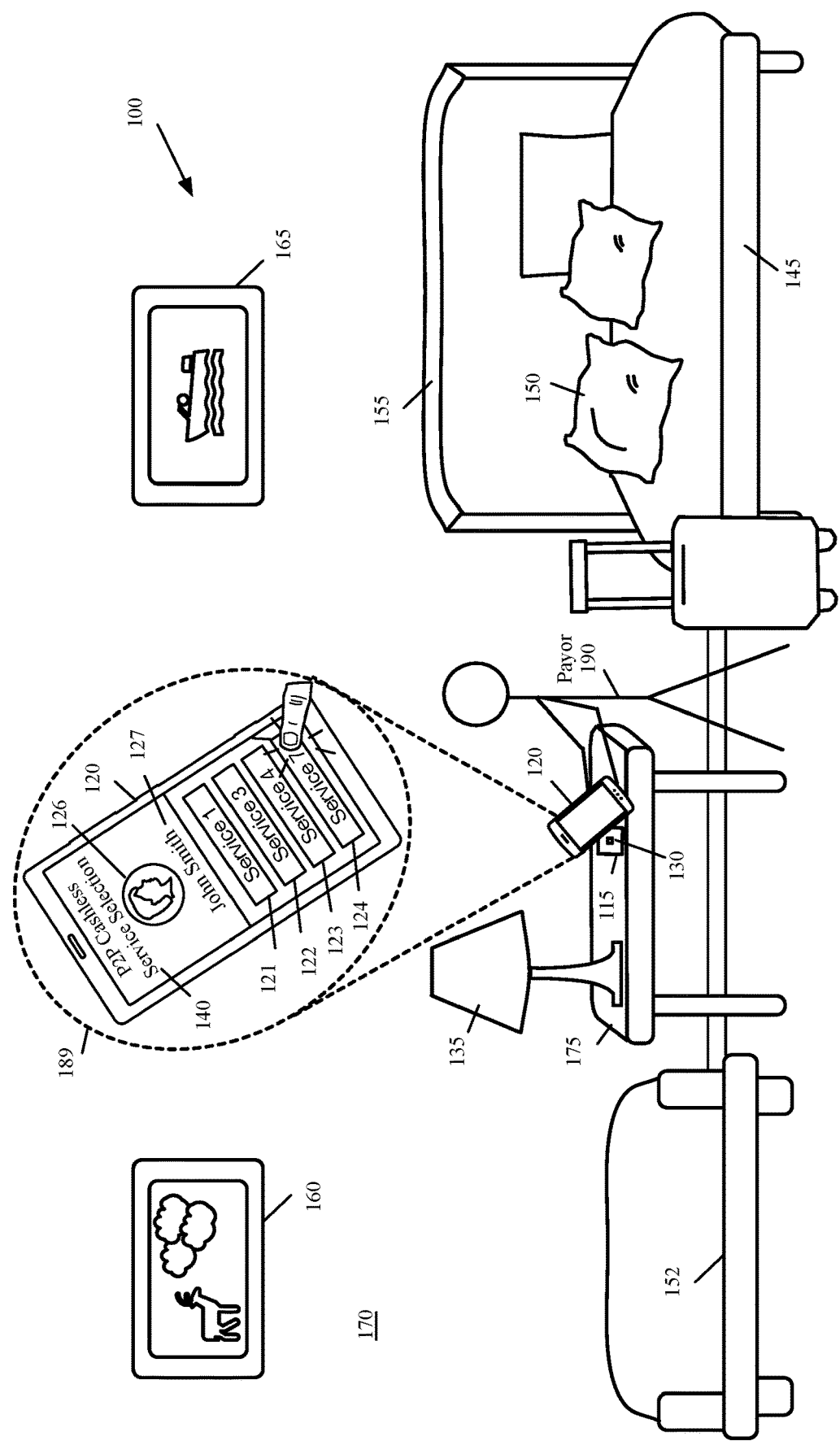
FIG. 1D is a functional block diagram illustrating a payor using the multiple P2P cashless payment applications launcher device of FIG. 1C to launch the P2P cashless service selection application to select one of a plurality of P2P cashless payment applications to make a P2P payment, according to various aspects of the present disclosure.

FIG. 1D is a functional block diagram illustrating a payor using the multiple P2P cashless payment applications launcher device of FIG. 1C to launch the P2P cashless service selection application 140 to select one of a plurality of P2P cashless payment applications to make a P2P payment, according to various aspects of the present disclosure. The P2P cashless service selection application 140 may be launched when the mobile device 120 is brought to the vicinity of the NFC chip 130 of FIG. 1A or 1C.

With reference to FIG. 1D, the NFC chip 130 may be preprogrammed with, and may pass, the identification of the P2P cashless service selection application 140 to the mobile device 120. The NFC chip 130 may also be preprogrammed with, and may pass, the identification of the payee, who is associated with the device 115, to the mobile device 120.

The identification of the P2P cashless service selection application 140, in some embodiments, may be an address such as a URI, a URL, etc., used by the mobile device to launch the P2P cashless service selection application 140.

In some embodiments, of the P2P cashless service selection application may be activated by pointing to a URL address by a web browser. In some embodiments, the P2P cashless service selection application may be an application that is installed on the mobile. In some embodiments, the P2P cashless service selection application may include a client application that is installed on the mobile device and may be activated to communicate with a remote server to display a list of the P2P cashless payment applications, and launch a selected P2P cashless payment application, as described herein.

The identification of the payee may include any information that may be used by the P2P cashless service selection application 140 and/or any P2P cashless payment application that is selected by the payor to identify the payee. The identification of the payee may include, for example, and without limitations, one or more of the payee's user identification, the payee's picture, the payee's phone number, the payee's email, the payee's first and/or family name, the payee's title, the payee's place of business, etc.

As shown in the expanded view 189, the P2P cashless service selection application 140 may display the identification of the payee. The identification may include, for example, and without limitations, one or more of the payee's user identification 127, the payee's picture 126, the payee's phone number, the payee's email, the payee's first and/or family name, the payee's title, the payee's place of business, etc.

The P2P cashless service selection application 140 may display the identification 121-124 of a plurality of P2P cashless payment applications to which the payee is subscribed. The payor 190 may then select one of the P2P cashless payment applications 121-124, to which the payor is also subscribed, to make a P2P cashless payment to the payee 110 (FIGS. 1A and 1C). The selected P2P cashless payment applications then display a user interface, such as the user interface shown in the expanded view 188 of FIG. 1B to make the payment.

Figure 2:
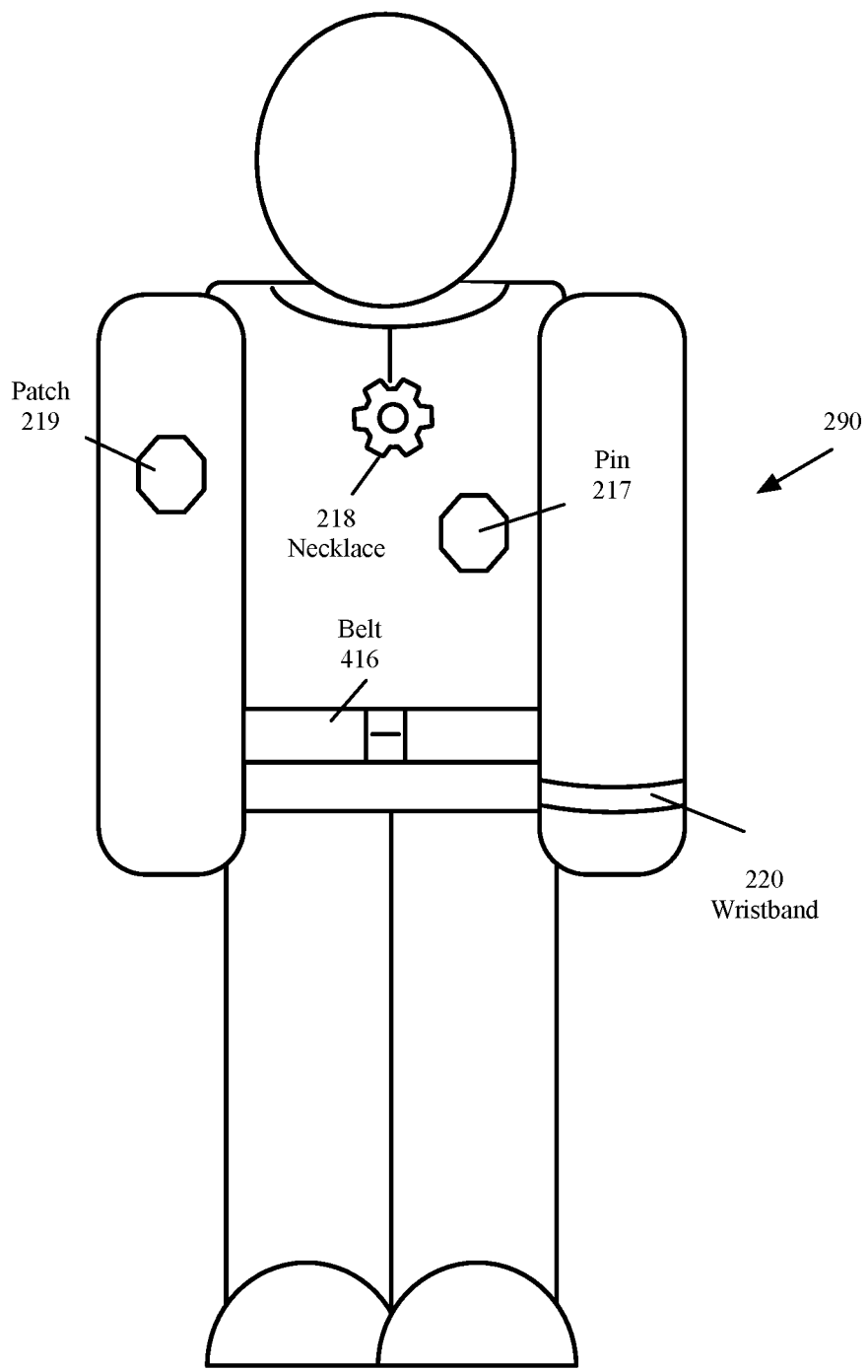
FIG. 2 is a functional diagram illustrating several examples of wearable multiple P2P cashless payment applications launcher devices that may be placed on different items of clothing for launching multiple P2P cashless payment applications on a mobile device, according to various aspects of the present disclosure.

In some embodiments, the P2P cashless payment application launcher NFC chips 125 and/or the P2P cashless service selection application launcher NFC chip 130 may by worn on an item of clothing by a person who may expect to receive a payment after providing a service or selling an item. FIG. 2 is a functional diagram illustrating several examples of wearable multiple P2P cashless payment applications launcher devices that may be placed on different items of clothing for launching multiple P2P cashless payment applications on a mobile device, according to various aspects of the present disclosure.

With reference to FIG. 2, the person 290 may wear the P2P cashless payment application launchers NFC chip 125 and/or the P2P cashless service selection application launcher NFC chip 130 on a bracelet or wristband 220, on a belt 216, on a necklace 218, etc. The cashless payment application launchers 125 and/or the application launcher 130 may be attached to an item of clothing such as, for example, and without limitations, a jacket, a shirt, a hat, etc., as a pin 217, a patch or a pad 219, etc.

The person 290 may be a service provider or a seller such as, without limitation, a parking attendant, a valet parking worker, a vendor, a full-service gas station attendant, a person providing room, maid or janitorial service, a porter, a concierge, a steward, a warden, a doorperson, a watchperson, a bell captain, a manager, a custodian, a curator, an overseer, hair stylist, nail salon person, spa person, gardener, waiter, hostess, bus boy, taxi, uber driver, shuttle driver, golf caddie, resort personnel, massage therapist, street vendor, tour guides, "lemonade stands," "food trucks," babysitters, etc. Each one of the multiple P2P cashless payment applications launcher devices 216-220 may include several NFC chips 125 and/or the NFC chip 130 as discussed above with reference to the device 115 of FIGS. 1A and 1C.

The multiple P2P cashless payment applications launcher device, in some embodiments may be a throwable object. For example, the application launchers 125 and 130, in some embodiments, may be attached to a throwable object that may be thrown or passed to a payor who is at a distance. For example, and without limitations, the payor may be sitting in a stadium bench several rows away from a vendor who has passed a merchandise to the payor. The payee may throw or pass the throwable object to the payor. the payor may make a payment and through the object back to the payee. FIGS. 3A-3C illustrate several non-exclusive examples of such a throwable object.

FIG. 3A is a front elevation view of an example embodiment of a throwable object with an application launder for launching a mobile application for selecting one of several cashless payment methods, according to various aspects of the present disclosure. With reference to FIG. 3A, the throwable object 301 may be in the shape of a baseball. In the example of FIG. 3A, an application launcher 130 is installed on the throwable object 301. The application launcher 130 may be, for example, embedded on a pad 310 that is affixed on the throwable object 301 or may be directly attached (e.g., by a glue, a tape, etc.) to the throwable object 301.

FIG. 3B is a front perspective view of an example embodiment of a throwable object with several application launchers for launching different cashless payment methods, according to various aspects of the present disclosure. With reference to FIG. 3B, the throwable object 302 may be in the shape of a football. In the example of FIG. 3B, several application launchers 125 may be installed on the throwable object 302. Each application launcher 125 may be used to launch a specific cashless transfer application on a mobile phone. The application launchers 125 may be, for example, embedded on a pad 320 that is affixed on the throwable object 302 or may be directly attached (e.g., by a glue, a tape, etc.) to the throwable object 302.

FIG. 3C is a front elevation view of an example embodiment of a throwable object with several application launchers for launching different cashless payment methods and application launcher for launching a mobile application for selecting one of several cashless payment methods, according to various aspects of the present disclosure. With reference to FIG. 3C, the throwable object 303 may be in the shape of a stuffed animal.

In the example of FIG. 3C, several application launchers 125 may be installed on the throwable object 303. Each application launcher 125 may be used to launch a specific cashless transfer application on a mobile phone. In addition, an application launcher 130 may be installed on the throwable object 303 that may launch an application on a mobile device that allows selection on one of several cashless payment methods. The application launchers 125 and 130 may be, for example, embedded on a pad 330 that is affixed on the throwable object 303 or may be directly attached (e.g., by a glue, a tape, etc.) to the throwable object 303.

The exemplary embodiments of FIGS. 1A-3C provide several advantages for performing payments. In the example of FIGS. 1A-1B, the payee (e.g., the person 110) may not be present when he/she is being paid. In the past, the payor had to leave cash or check in a place to which the payor believed the payee may have access. There were no guarantees that the cash or check would end up in the right person's hand.

In the embodiments of the present disclosure, the device 115 is preprogrammed to launch any of the cashless payment applications to which the payee is subscribed (e.g., by selecting any of the application launchers 125 and/or 135). The device 115 is preprogrammed with the account information for the payee and as soon as a payor selects an application to which the payor is also subscribed, the payor may use the device 115 to launch the selected application, which may immediately display the preprogrammed account information of the payee.

In the example of FIGS. 2 and 3A-3C, the payee may be present when he/she is being paid. In the past, the payor had to either pay by cash, check, or credit card or the two parties (assuming they are strangers) had to exchange their information, such as the cashless payment application to which both parties are subscribed to, the name and/or the identification of the payee, an email or mobile number to exchange the information, etc. The parties had to make sure that the payor searches for and/or types the correct information on the payor's mobile device. The use of the multiple P2P cashless payment applications launcher devices 216-220 and 310-330 eliminates the time-consuming exchange of the information as well as the possible payment by cash, check, or credit card.

Another benefit of the cashless payment application launcher devices 115, 216-220, and 310-330 is to eliminate credit cards and the fees charged by the credit card companies for making payments by credit cards. The P2P cashless payment applications used in the present embodiments use the bank accounts of the payee and the payor for money transfer rather than using a credit card, thereby eliminating the credit card processing fees. For example, when a restaurant patron pays a tip to a server by a credit card, the restaurant has to not only pay a percentage as a service fee for the food and beverage that the restaurant sells but also the same percentage on the additional tip amount that the patron pays to a server via credit card. Furthermore, the term "cashless" transaction is referred to an electronic transaction that does not require handing physical currency, coins, notes, checks, etc., between two persons.

As an illustration, if the patron pays a 20% tip on the bill and the credit card company charges 3% fee, the restaurant has to pay an extra 3% fee for the added 20% tip amount, which is an amount that the restaurant has to pass on or deduct from the server's original tip amount. Even if the restaurant deducts the fee from the server, the server is the one who has to pay the 3% fee from the original tip amount that the server receives. In the case where the restaurant receives the payment for the food and drink and the tip through a P2P cashless payment application that electronically transfers cash, rather than paying through a credit card, the restaurant may save the 3% credit card fee on the total amount of the payment, including on the additional amount of the tip.

A similar saving may be made by for example, and without any limitations, a gas station that may place a device such as the device 115 next to each pump to receive P2P cashless payment to avoid paying credit card fees. Another example may be placing the device 115 next to a gambling machine, such as a slot machine, to provide a cash credit to a gambler without charging a credit card service fee, as well as not having to fund the machine with dollars bills.

A further benefit of the multiple P2P cashless payment applications launcher devices of the present embodiments is to eliminate the need for the employers to keep track of the tips that has to be passed to the servers. The multiple P2P cashless payment applications launcher devices of the present embodiments further eliminate the complaints and/or the lawsuits that servers may instantiate against their employers for not paying them the exact tips that are paid by the patrons.

Figure 4:
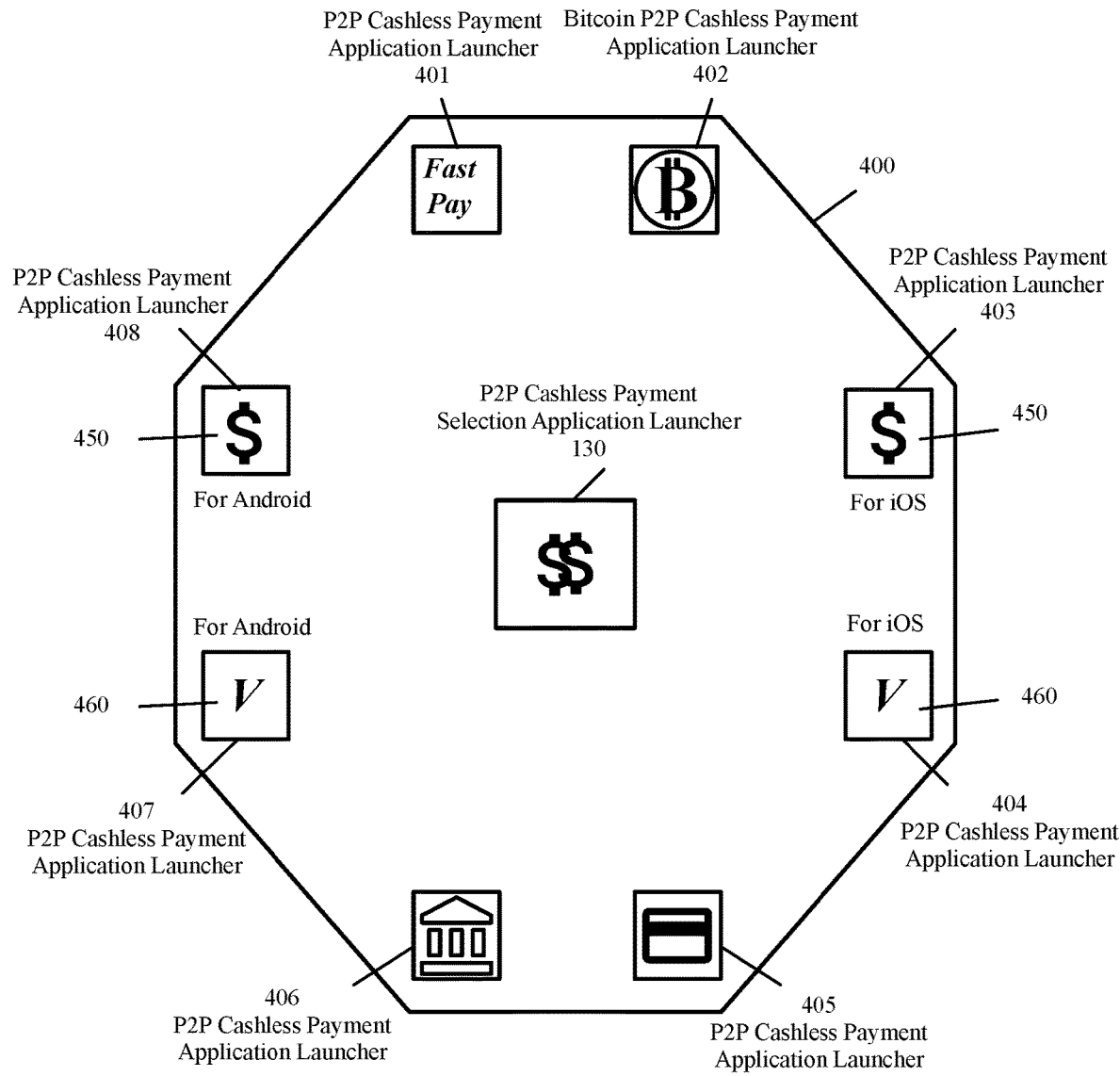
FIG. 4 is a front elevational view of an example embodiment of a portable device for launching multiple P2P cashless payment applications on a mobile device, according to various aspects of the present disclosure.

FIG. 4 is a front elevational view of an example embodiment of a portable device for launching multiple P2P cashless payment applications on a mobile device, according to various aspects of the present disclosure. With reference to FIG. 4, the portable device may be similar to any one of the portable devices 115, 216-220, and 310-330 described above.

The multiple P2P cashless payment applications launcher device 400 may include several NFC chips 401-408. Each NFC chip 401-408 may be preprogrammed to launch a specific P2P cashless payment application on a mobile device that is equipped with an NFC chip and comes in proximity of the corresponding chip.

The P2P cashless payment applications may include applications to transfer cash from a payor's bank account to a payee's bank account or transfer cryptocurrency or digital currency such as, for example, and without limitations, bitcoins and/or fiat money from a payor's cryptocurrency account (e.g., a digital wallet) to a payee's cryptocurrency account. The cryptocurrency may be transferred as a quantity of a whole number or a fractional number of cryptocurrency. Fiat money is a currency established as money, for example, by government regulation and may have no intrinsic value. Some of the P2P cashless payment application may also allow a person (e.g., the payee and/or the payor) to keep funds in an account associated with the P2P cashless payment application until the person transfer the funds to an account or to use the funds to pay for services or merchandise.

Each NFC chip 401-408 may be preprogrammed with the information of a payee (such as the person/company account 110 of FIG. 1A or the person/company account 290 of FIG. 2) needed by each specific P2P cashless payment application in order to immediately display the payee's information on the mobile device of a payor who intends to pay the payee.

The NFC chip 130 may be used by the mobile device of the payor to launch an application program that allows the selection of one of several P2P cashless payment applications to which the payee (e.g., the person 110 or 290) is subscribed as well as displaying the profile of the payee on the payor's mobile device upon the selection of one of the cashless payment applications.

With reference to FIG. 4, the device 400 may be made of a material such as, for example, and without limitation, silicone or rubber, acrylics, leathers, metals, plastics, etc. The NFC chips 401-408 and 130 may be embedded in the material during the manufacturing process of the device 400 or post manufacturing by, for example, adhesively attaching the NFC chips to the device 400. For example, the NFC chips may be embedded in the material during manufacturing of the device 400 such that a thin layer of material (e.g., a few millimeters) cover the chip for protection. The thickness of the layer covering each chip may be made such that an NFC chip on a mobile device may be able to communicate with the NFC chip embedded in the device 400.

As an example, a mold may be designed and produced and the NFC chips may be inserted in certain designated slots in the mold. The material such as, without limitation, silicone may then be injected in the mold and then cool dried to hold the shape of the designed product.

In some aspects of the present embodiments, the NFC chips may be held by the device 400 such that a portion of the NFC chip is not covered by the device's material. The distance between each two of the NFC chips may be such that no NFC chip 401-408 and 130 may interfere with another NFC chip.

It should be understood that the shape of the devices 115, 216-220, 310-330, and 400 and the number of NFC chips embedded on the devices 115, 216-220, 310-330, and 400 may be different in different embodiments. The shape of the multiple P2P cashless payment applications launcher devices 115, 216-220, 301-303, and 400 may be any arbitrary shape to enable the placement of the NFC chips with enough distance from each other to prevent the chips magnetic fields from interfering with each other when activated.

Some embodiments may not include the chip 130 that launches the cashless service selection application. These embodiments may include two or more of the chips 401-408, where each chip may launch a specific cashless payment application on a mobile device. Some embodiments may only include the chip 130. Other embodiments, such as the embodiment illustrated in FIG. 4 may include the chip 130 as well as several of the chips 401-408.

With reference to FIG. 4, the device 400 may clearly label or otherwise identify each P2P cashless payment application by a logo, a name, a description, etc. As shown in the example of FIG. 4, some of the cashless payment applications may have different applications for different operating systems. For example, the cashless payment application identified by the logo 450 may need two different application launchers NFC chips 408 and 403 for different operating system, for example, and without limitations, one application launcher NFC chip 408 for the Android operating system and one application launcher NFC chip 403 for iOS operating system.

Similarly, the cashless payment application identified by the logo 460 may need two different application launchers NFC chips 407 and 404 for different operating systems, for example and without limitations, one NFC chip 407 for the Android operating systems and one NFC chip 404 for the iOS operating system. The chips may be embedded in a pouch sewn on the fabric or may be embedded in a silicone mold, rubber mold, plastic mold, etc. It should be understood that the shape of the device 400 and the number of NFC chips embedded on the device 400 may be different in different embodiments.

Examples of the P2P cashless payment applications may include, for example, and without limitation, Apple Cash, Samsung Pay, Goggle Pay Cash, PayPal, Cash App developed by Square Inc., Venmo, Zelle, Facebook Messenger, Instagram, WeChat, etc. The P2P cashless service selection application that is launched by the NFC chip 130 is an application provided by some of the present embodiments to select one of several third-party P2P cashless payment applications.

Figure 5A:
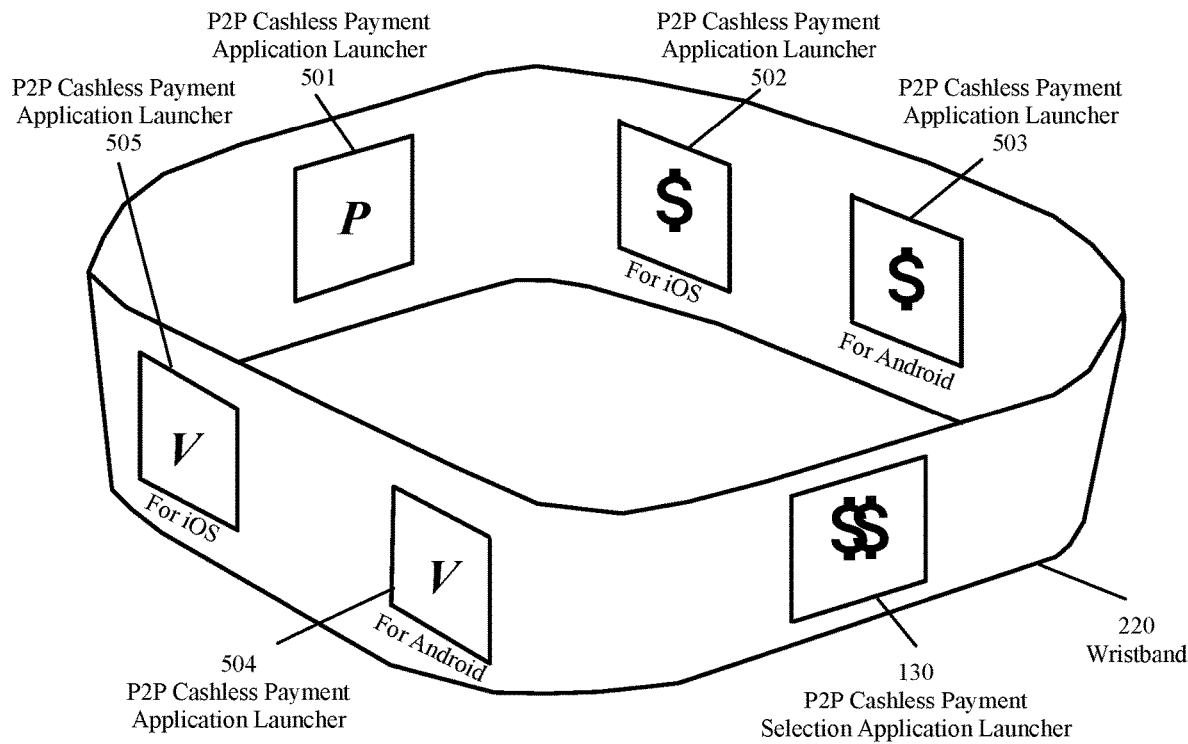
FIG. 5A is a perspective view of an example embodiment of a wearable device for launching multiple P2P cashless payment applications on a mobile device, according to various aspects of the present disclosure.
Figure 5B:
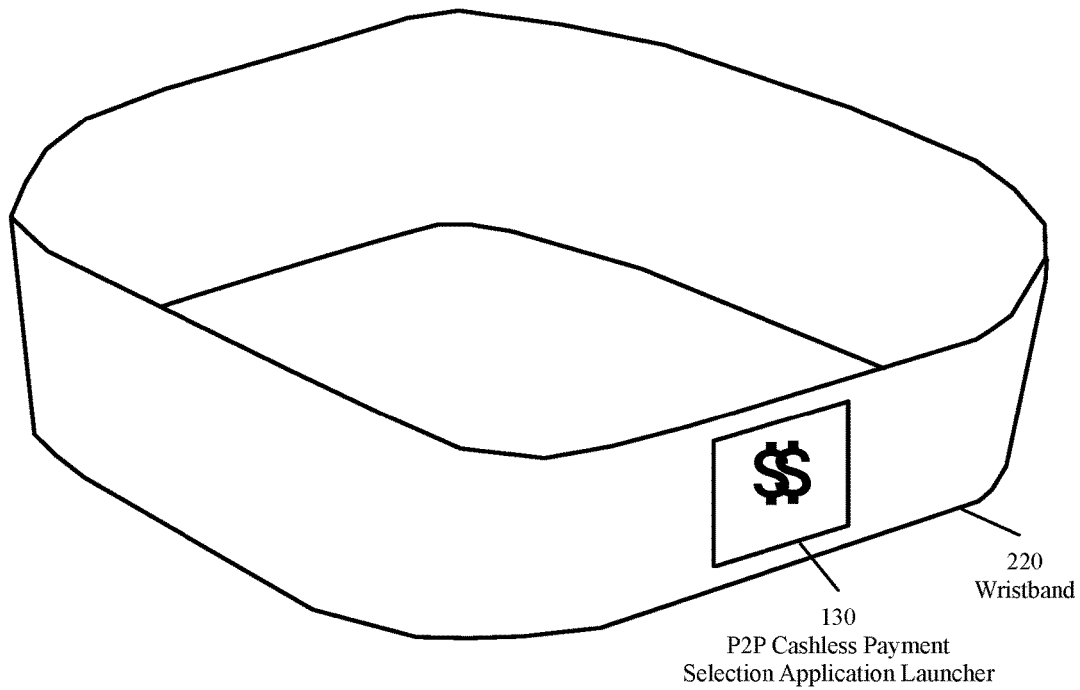
FIG. 5B is a perspective view of an example embodiment of a wearable device for launching a P2P cashless service selection application for presenting a plurality of cashless payment applications on a mobile device, according to various aspects of the present disclosure.

FIG. 5A is a perspective view of an example embodiment of a wearable device for launching multiple P2P cashless payment applications on a mobile device, according to various aspects of the present disclosure. FIG. 5B is a perspective view of an embodiment of a wearable device for launching a P2P cashless service selection application for presenting a plurality of cashless payment applications on a mobile device, according to various aspects of the present disclosure.

With reference to FIGS. 5A-5B, the device 220 may be worn as a wristband, for example as shown in FIG. 2. The wristband 220, in FIG. 5A, may have several P2P cashless payment application launchers 501-506. The applicant launchers 501-505 may be NFC chips, similar to the NFC chips 125 as described above with reference to FIGS. 1A-1B. In addition to the NFC chips 501-505, the wristband 220 of FIG. 5A, in some embodiments, may include a P2P cashless service selection application launcher 130 as described above with reference to FIG. 1A-1D. The wristband 220 of FIG. 5B may only include the P2P cashless service selection application launcher 130. The wristband 220 may be made of, without limitations, fabric, plastic, silicone, rubber, metals, plastics, leathers, etc.

Figure 6:
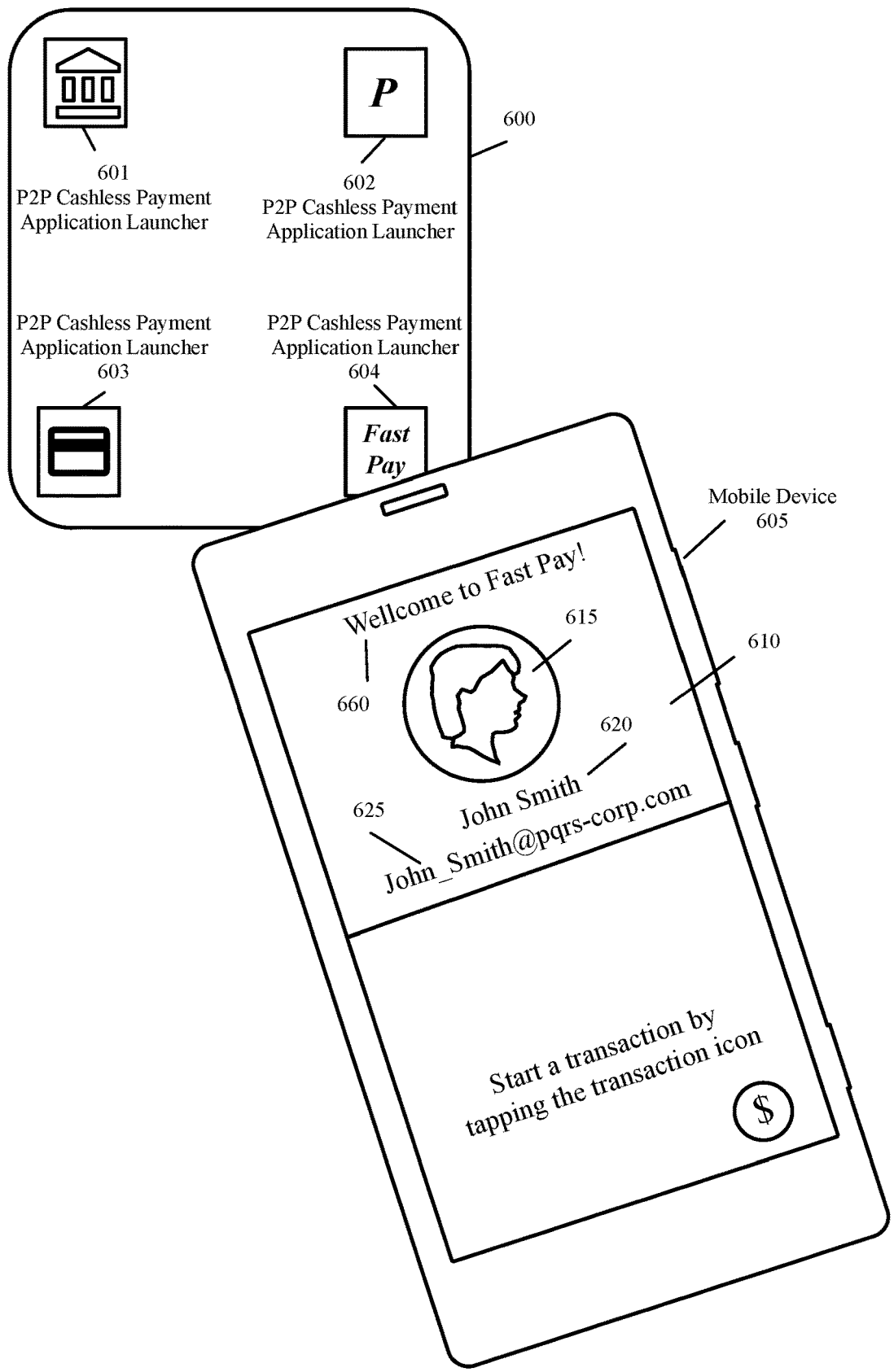
FIG. 6 is a functional diagram illustrating an example embodiment of a system for launching one of several cashless payment applications using a multiple P2P cashless payment applications launcher device, according to various aspects of the present disclosure.

FIG. 6 is a functional diagram illustrating an example embodiment of a system for launching one of several P2P cashless payment applications using a multiple P2P cashless payment applications launcher device, according to various aspects of the present disclosure. With reference to FIG. 6, the multiple P2P cashless payment applications launcher device 600 may be similar to any of the devices 115, 216-220, 301-302, and 400 described above with reference to FIGS. 1A-5B.

In the example of FIG. 6, the device 600 does not include the P2P cashless service selection application launcher 130 described above. The mobile device 605 may include an NFC chip (not shown). When the NFC chip of the mobile device is brought to the proximity of one of the P2P cashless payment application launchers 601-604 (in this example, the P2P cashless payment application launcher 604), the mobile device 605 may receive the information for launching the corresponding P2P cashless payment application 660. The mobile device 605 may then launch the P2P cashless payment application 660.

With further reference to FIG. 6, the multiple P2P cashless payment applications launcher device 600 is preprogrammed with the information of a particular payee, for example, a person or a company account (e.g., the person 110 of FIG. 1A or the person 290 of FIG. 2). Therefore, when the NFC chip of the mobile device is brought to the proximity of one of the P2P cashless payment application launchers 601-604, the profile and/or the user identification of the particular person/company is passed to the launched P2P cashless payment application 660.

The P2P cashless payment application 660 may then automatically show the identification of the payee on the payor's mobile device 605. The payee's identification may include, for example, and without limitation, the picture 615, the name 620, the email 625, the phone number (not shown), etc. The payee's identification may be, for example, and without limitations, the payee's first name and/or last name, a profile name, a username, or any name that the payee chose to be used as the payee's name when the payee previously registered with the selected P2P cashless payment application 660.

The system of FIG. 6 provides the advantage that the payor (e.g., the user of the mobile device 605) and the payee do not need to exchange any verbal, text message, or email messages between each other in order for the cashless payment application 660 to display the information of the person 110 or 290. The user of the mobile device 605 does not need to search and/or enter any information regarding the payee in order to display the profile of the payee on the display 610 of the mobile device 605. The payor (e.g., the user of the P2P cashless payment application 660 on the mobile device 605) may then proceed to make a payment using the application 660 as described with reference to FIG. 7.

Figure 7:
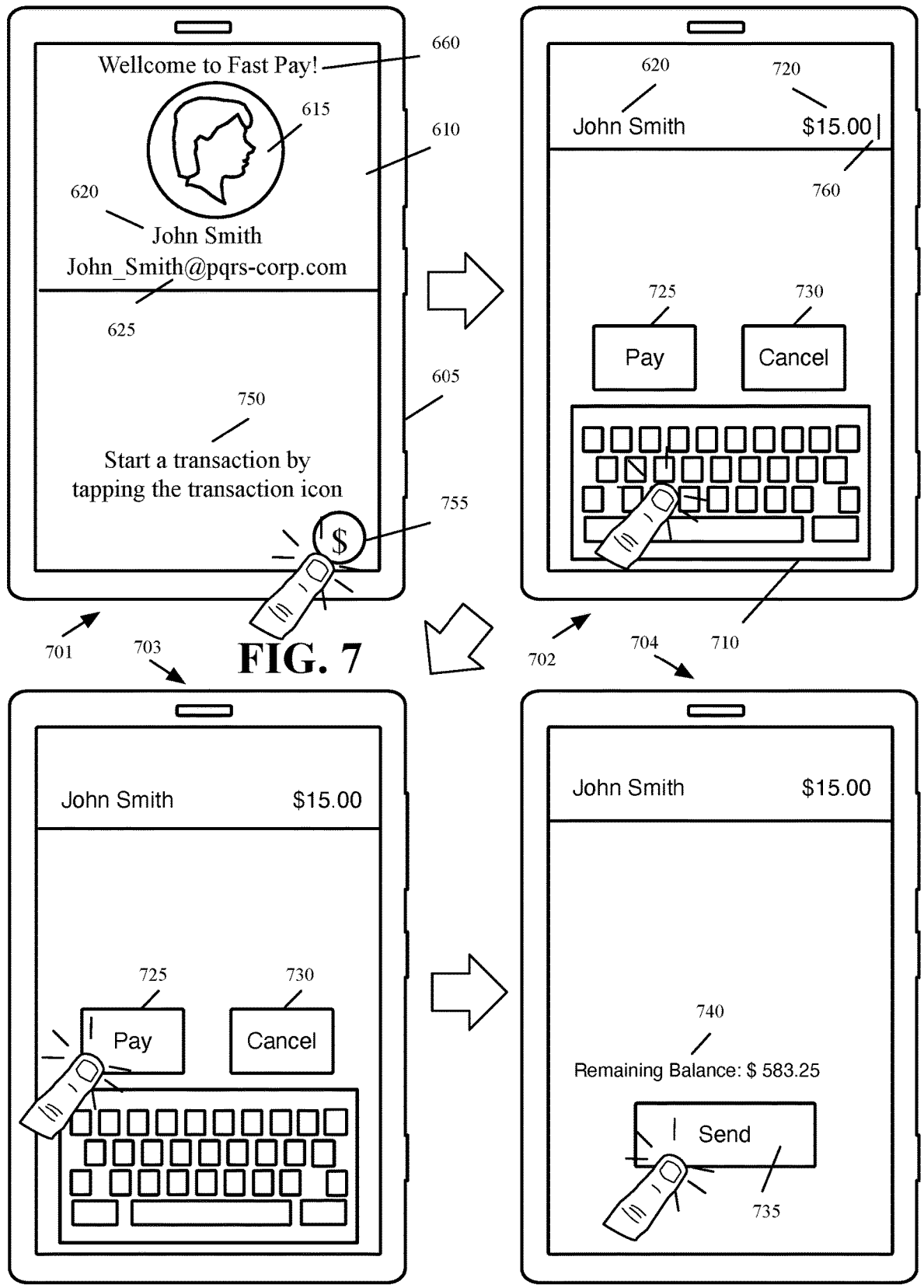
FIG. 7 is a schematic front view of an example user interface of a mobile device illustrating a P2P cashless payment application that is launched from a device for launching multiple P2P cashless payment applications, according to various aspects of the present disclosure.

FIG. 7 is a schematic front view of an example user interface of a mobile device illustrating a P2P cashless payment application that is launched from a device for launching multiple P2P cashless payment applications, according to various aspects of the present disclosure. FIG. 7, as shown, includes four operational stages 701-704. In stage 701, a mobile device, for example, the mobile device 605 of FIG. 6, launches the P2P cashless payment application 660 as described above with reference to FIG. 6. The P2P cashless payment application 660 may be an application that electronically transfers cash between the accounts of a payor and a payee. The P2P cashless payment application 660 may be an application that transfer bitcoins between accounts of a payor and a payee.

With reference to FIG. 7, the cashless payment application 660 may prompt (as shown by 750) the user of the mobile device 605 to start a transaction by tapping a transaction icon 755. As shown in stage 701 the mobile device 605 may receive a selection of the transaction icon 755.

As shown in stage 702, in response to the selection of the transaction icon 755, the mobile device 605 may display a keyboard 710 to allow the user of the mobile device 605 to enter an amount 720 for making a transaction. The amount may be displayed, for example, where a cursor 720 is pointing to. The amount may be a cash amount or a number of bitcoins. The P2P cashless payment application 660 may display an option 725 for making a payment and an option 730 to cancel.

As shown in stage 703, the P2P cashless payment application 660 may receive a selection of the pay option 725. In response, the P2P cashless payment application 660 may display, in stage 704, an option 735 for sending the payment to the identified payee 620. When the cashless payment application 660 receives a selection of the option 735, the payment is transferred to the payee's 620 account. The P2P cashless payment application 660 may display the remaining balance 740 of the user of the mobile device 605. The P2P cashless payment application 660 may also send an electronic message to the payee and/or the payor regarding the payment.

Figure 8:
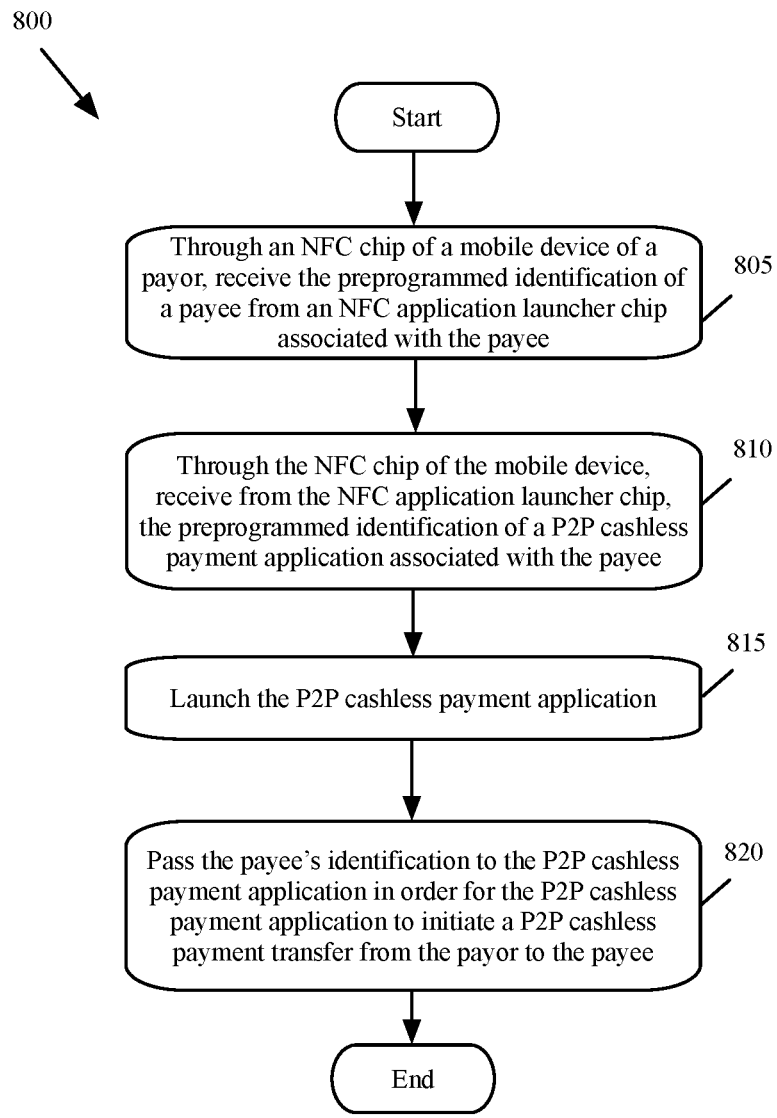
FIG. 8 is a flowchart illustrating an example process for a mobile device to receive the identification of a payee and the identification of a P2P cashless payment application associated with the payee from an application launcher NFC chip, according to various aspects of the present disclosure.

FIG. 8 is a flowchart illustrating an example process 800 for a mobile device to receive the identification of a payee and the identification of a P2P cashless payment application associated with the payee from an application launcher NFC chip, according to various aspects of the present disclosure. The process 800, in some of the present embodiments, may be performed by a processor of a mobile device, such as the mobile device 120 of FIG. 1A-1B or the mobile device 605 of FIG. 6.

With reference to FIG. 8, through an NFC chip of a mobile device of a payor, the preprogrammed identification of a payee may be received (at block 805) from an application launcher NFC chip associated with a payee. For example, the processor of the mobile device 605 of FIG. 6 may receive the preprogrammed identification of the payee when the NFC chip of the mobile device 605 is brought to the proximity of the application launcher NFC chip 604. The NFC chip 604 may modulate the preprogrammed identification of the payee in a magnetic field and inductively couple this magnetic field to the mobile device's NFC chip.

The identification of the payee may include any information that may be used by the P2P cashless payment application to identify the payee as an account holder. The identification of the payee may include, for example, and without limitations, one or more of the payee's user identification, the payee's picture, the payee's phone number, the payee's email, the payee's first and/or family name, the payee's title, the payee's place of business, etc.

With further reference to FIG. 8, through the NFC chip of the mobile device, the preprogrammed identification of a P2P cashless payment application associated with the payee may be received (at block 810) from the NFC application launcher chip. For example, the processor of the mobile device 605 of FIG. 6 may receive the preprogrammed identification of a P2P cashless payment application 660 when the NFC chip of the mobile device 605 is brought to the proximity of the application launcher NFC chip 604. The NFC chip 604 may modulate the preprogrammed identification of the P2P cashless payment application 660 in a magnetic field and inductively couple this magnetic field to the mobile device's NFC chip. The identification of the P2P cashless payment application, in some embodiments, may be a URL address that may be used by the mobile device to launch the P2P cashless payment application.

With continued reference to FIG. 8, the P2P cashless payment application may then be launched (at block 815). For example, the processor of the mobile device 605 of FIG. 6 may launch the P2P cashless payment application 660 as shown in FIG. 6. The payee's identification may be passed (at block 820) to the P2P cashless payment application in order for the P2P cashless payment application to initiate a P2P cashless payment transfer from the payor to the payee. For example, the P2P cashless payment application may receive and display the payee's identification as described above with reference to FIG. 7. The process 800 may then end.

The specific operations of the process 800 may not be performed in the exact order shown and described. Furthermore, the specific operations described with reference to FIG. 8 may not be performed in one continuous series of operations, in some aspects of the present disclosure, and different specific operations may be performed in different embodiments.

For instance, in some aspects of the present embodiments, the operation at block 810 may be performed before the operation at block 805. In other embodiments, the operations of blocks 805 and 810 may be performed simultaneously. For example, both the identification of the payee and the identification of the P2P cashless payment application may be received in the same signal at the NFC of the mobile device 605 from the NFC chip of the device 600 (FIG. 6). Furthermore, the operations at blocks 815 and 820, in some embodiments, may be performed simultaneously.

Figure 9:
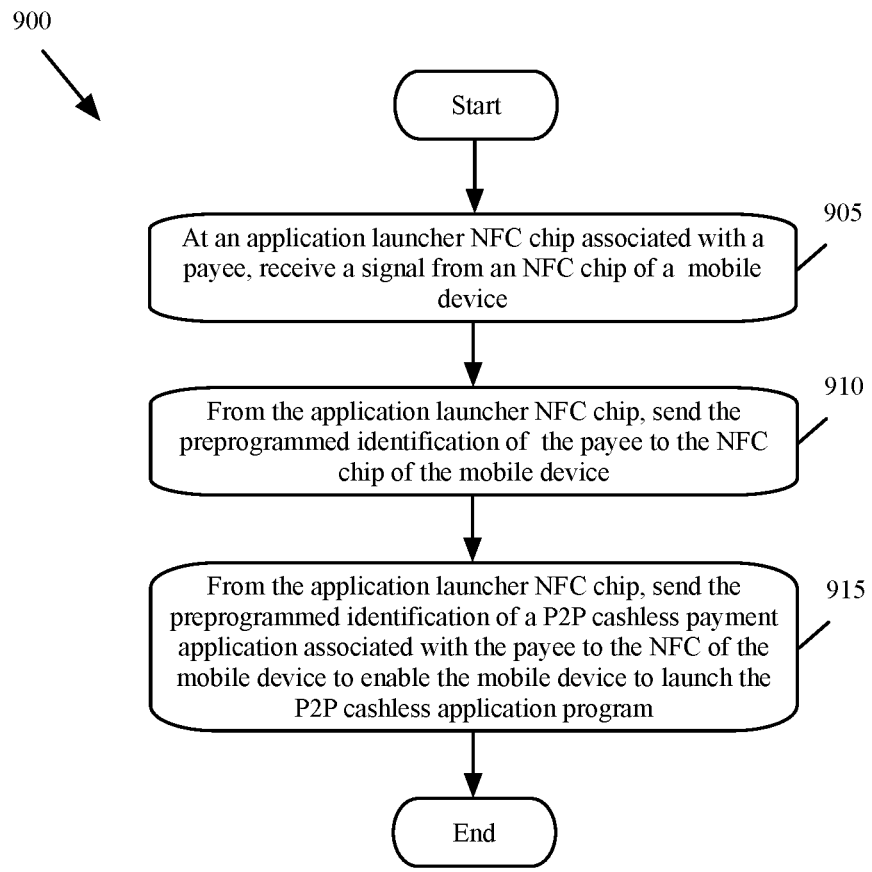
FIG. 9 is a flowchart illustrating an example process for an NFC application launcher chip to send the identification of a payee and the identification of a P2P cashless payment application associated with the payee to a mobile device, according to various aspects of the present disclosure.

FIG. 9 is a flowchart illustrating an example process 900 for an NFC application launcher chip to send the identification of a payee and the identification of a P2P cashless payment application associated with the payee to a mobile device, according to various aspects of the present disclosure. The process 900, in some of the present embodiments, may be performed by an NFC application launcher chip, such as any of the application launcher NFC chips 125 of FIG. 1A-1B or 601-604 of FIG. 6.

With reference to FIG. 9, at an application launcher NFC chip associated with a payee, a signal may be received (at block 905) from an NFC chip of a mobile device. For example, the application launcher NFC chip 604 of FIG. 6 may receive a signal when the NFC chip of the mobile device 605 is brought to the proximity of the application launcher NFC chip 604. As described above, the NFC chip of the mobile device 605 may generate a magnetic field which may induce an electric current in the antenna of the NFC chip 604.

Next, the preprogrammed identification of the payee may be sent (at block 910) from the application launcher NFC chip to the NFC chip of the mobile device. For example, the application launcher NFC chip 604 of FIG. 6 may modulate the preprogrammed identification of the payee in a magnetic field and inductively couple this magnetic field to the mobile device's NFC chip.

With further reference to FIG. 9, the preprogrammed identification of a P2P cashless payment application associated with the payee may be sent (at block 915) from the application launcher NFC chip to the NFC of the mobile device to enable the mobile device to launch the application program. For example, the application launcher NFC chip 604 of FIG. 6 may modulate the preprogrammed identification of the P2P cashless payment application in a magnetic field and inductively couple this magnetic field to the mobile device's NFC chip. The process 900 may then end.

The specific operations of the process 900 may not be performed in the exact order shown and described. Furthermore, the specific operations described with reference to FIG. 9 may not be performed in one continuous series of operations, in some aspects of the present disclosure, and different specific operations may be performed in different embodiments.

For instance, in some aspects of the present embodiments, the operation at block 915 may be performed before the operation at block 910. In other embodiments, the operations of blocks 910 and 25715 may be performed simultaneously. For example, both the identification of the payee and the identification of the P2P cashless payment application may be sent from the NFC chip of the device 600 (FIG. 6) to the NFC of the mobile device 605 in the same induced signal.

Figure 10:
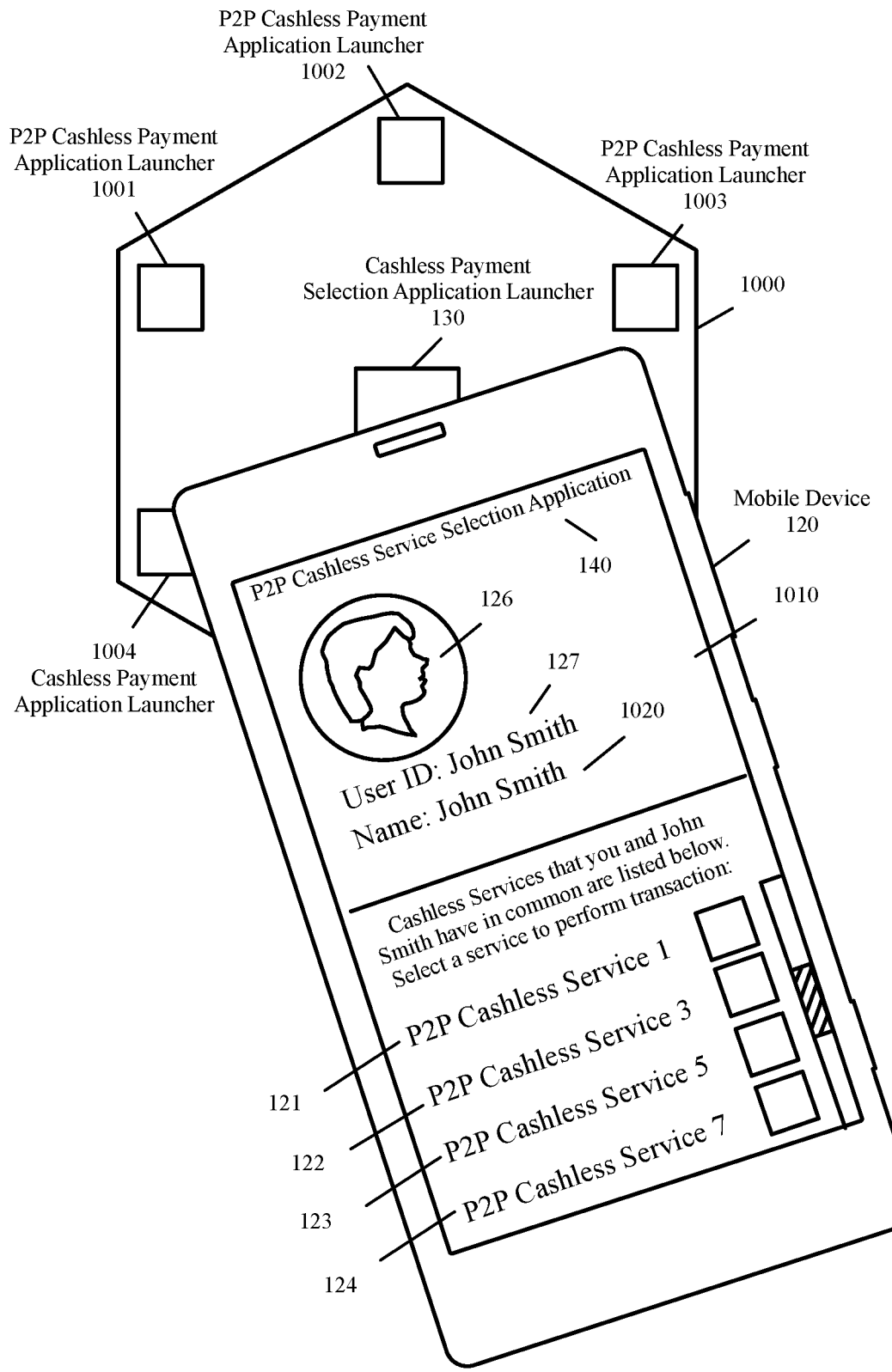
FIGS. 10 and 11 are functional diagrams illustrating example embodiments of systems for launching a P2P cashless service selection application on a mobile device, according to various aspects of the present disclosure.
Figure 11:
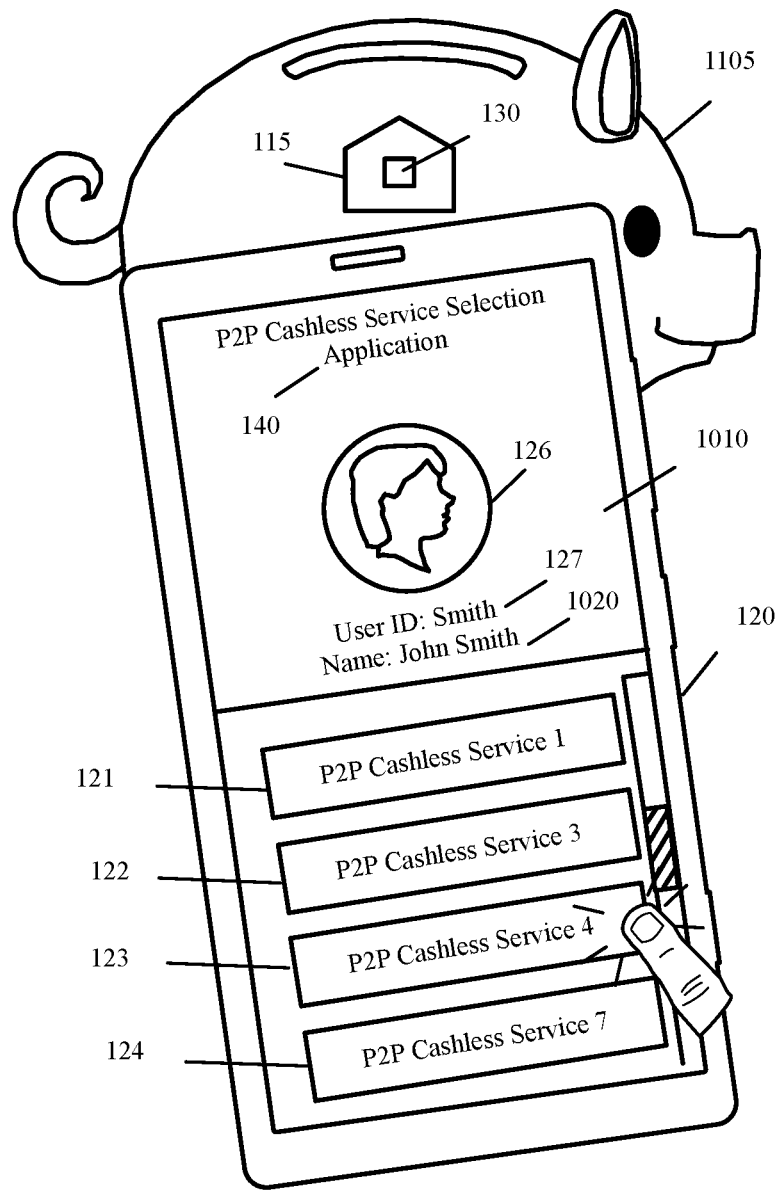

FIGS. 10 and 11 are functional diagrams illustrating example embodiments of systems for launching a P2P cashless service selection application on a mobile device, according to various aspects of the present disclosure. With reference to FIGS. 10 and 11, the NFC chip 130 may be an application launcher 130 that may launch a P2P cashless service selection application. The device 1000 of FIG. 10 may also include NFC chips 1001-1004 that may be used to launch specific P2P cashless payment applications while the device 1105 of FIG. 11 may only include the P2P cashless service selection application launcher NFC chip 130.

The mobile device 120 may include an NFC chip (not shown). When the NFC chip of the mobile device is brought to the proximity of the P2P cashless service selection application launcher 130, the P2P cashless service selection application 140 may be launched on the mobile device 120.

With further reference to FIGS. 10 and 11, since the P2P cashless service selection application launcher NFC chip 130 is preprogrammed with the identification of a particular payee (e.g., the person 110 of FIGS. 1A and 1C or the person 290 of FIG. 2), the profile and/or user identification of the particular payee is passed to the launched P2P cashless service selection application 140.

The P2P cashless service selection application 140 may then automatically show the identification of the payee such as, without limitation, the picture 126, the user identification 127, the name 1020, etc. The P2P cashless service selection application 140 may display several cashless payment applications 121-124 to which the payee is subscribed. The payor (e.g., the user of the mobile device 120) may then select one of the cashless payment applications 121-124, to which the payor is also subscribed to proceed with a P2P cashless transaction.

The systems of FIGS. 10 and 11 provide the advantage that the payor (e.g., the user of the mobile device 120) and the payee (e.g., the person 110 or 290 described above) do not need to exchange any verbal, text message, or email messages between each other in order to select a cashless payment application 121-124 to display the information of the person 110 or 290.

The payee does not even have to be present. As long as the device 1000 or the device 1105 is accessible to the payor (e.g., is left on a table, left on a tray, affixed to a chair, affixed to a wall, etc.), the payor may bring the mobile device 120 in close vicinity of the cashless payment application launchers 130 to initiate a payment to the payee. The user of the mobile device 120 does not need to search and/or enter any information regarding the payee in order to display the profile of the payee on the display 1010 of the mobile device 120.

Figure 12:
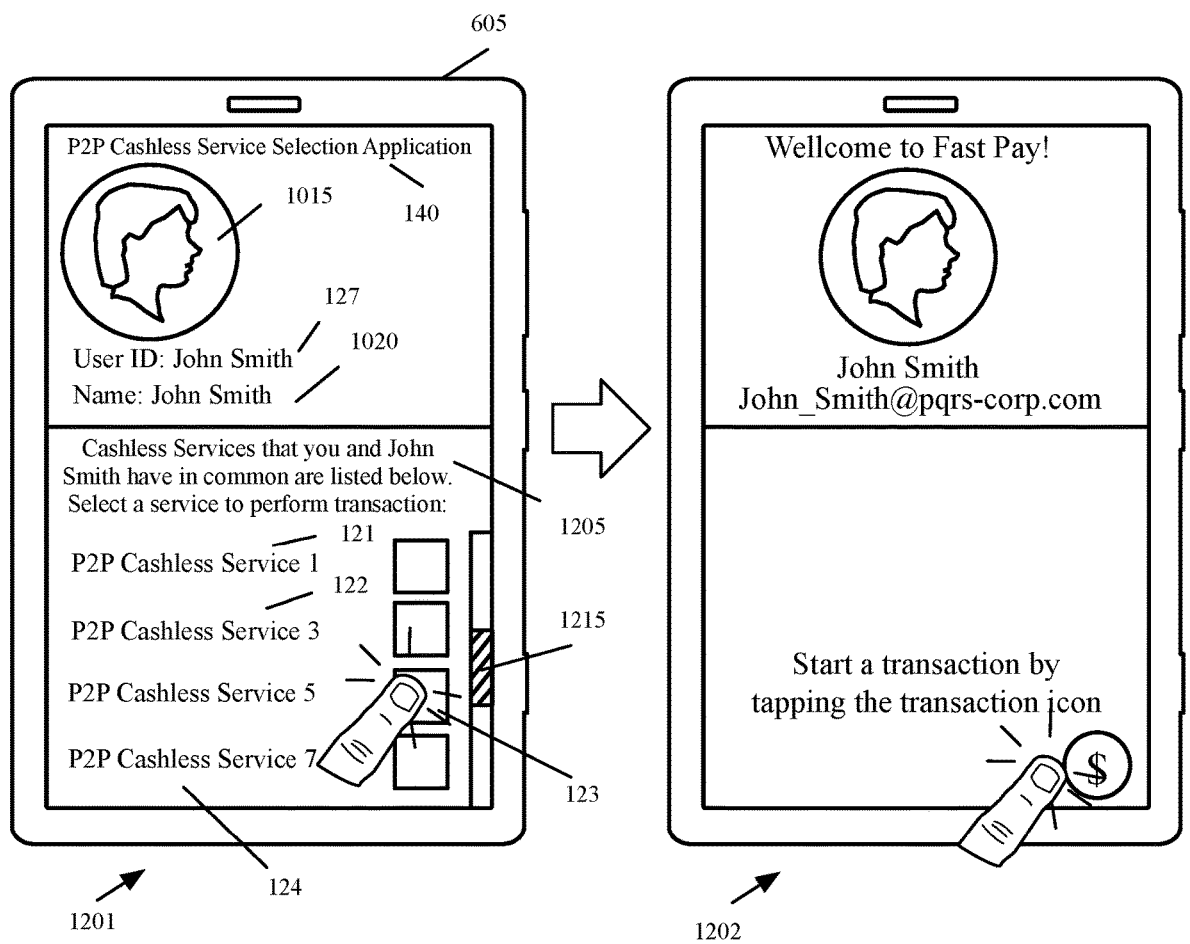
FIG. 12 is a schematic front view of an example user interface of a mobile device illustrating the selection of one of several P2P cashless payment applications that are provided by a P2P cashless service selection application launched through an NFC chip, according to various aspects of the present disclosure.

FIG. 12 is a schematic front view of an example user interface of a mobile device illustrating the selection of one of several P2P cashless payment applications that are provided by a P2P cashless service selection application launched through an NFC chip, according to various aspects of the present disclosure. FIG. 12, as shown, includes two operational stages 1201-1202. In stage 1201, the mobile device 120 launches the P2P cashless service selection application 140, as described above with reference to FIG. 10.

With reference to FIG. 12, the P2P cashless service selection application 140 may display several cashless payment applications 121-124 to which the payee is subscribed. More cashless payment applications may be displayed, for example, by using the scroll tool 1215.

As shown in stage 1201, the P2P cashless service selection application 140 may receive a selection of one of the P2P cashless payment applications, such as the P2P cashless payment application 123. In the example of FIG. 12, the P2P cashless payment application 123 is the same as the cashless payment application 660 of FIG. 7. The stage 1202 may therefore, be similar to the stage 702 of FIG. 7, which was described above.

Figure 13:
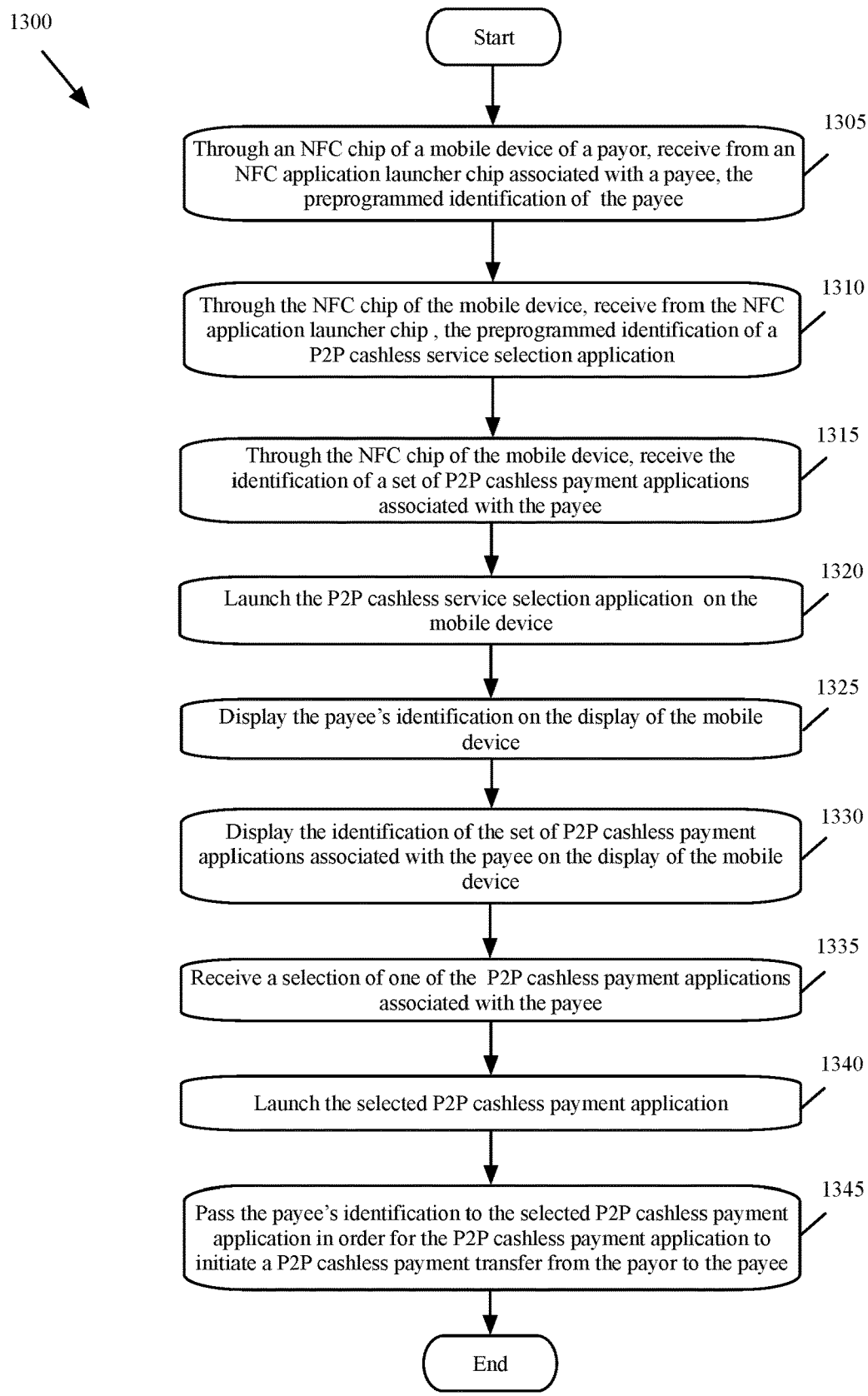
FIG. 13 is a flowchart illustrating an example process for a mobile device to receive the identification of a payee and the identification of a P2P cashless service selection application, according to various aspects of the present disclosure.

FIG. 13 is a flowchart illustrating an example process 1300 for a mobile device to receive the identification of a payee and the identification of a P2P cashless service selection application, according to various aspects of the present disclosure. The process 1300, in some of the present embodiments, may be performed by a processor of a mobile device, such as the mobile device 120 of FIGS. 1C 10, and 11.

With reference to FIG. 13, through an NFC chip of a mobile device of a payor, the preprogrammed identification of a payee may be received (at block 1305) from an application launcher NFC chip associated with the payee. For example, the processor of the mobile device 120 of FIG. 10 or 11 may receive the preprogrammed identification of the payee when the NFC chip of the mobile device 120 is brought to the proximity of the P2P cashless service selection application launcher NFC chip 130. The NFC chip 130 may modulate the preprogrammed identification of the payee in a magnetic field and inductively couple this magnetic field to the mobile device's NFC chip.

The identification of the payee may include any information that may be used by the P2P cashless payment application to identify the payee as an account holder. The identification of the payee may include, for example, and without limitations, one or more of the payee's user identification, the payee's picture, the payee's phone number, the payee's email, the payee's first and/or family name, the payee's title, the payee's place of business, etc.

With further reference to FIG. 13, through the NFC chip of the mobile device, the preprogrammed identification of a P2P cashless service selection application may be received (at block 1310) from the P2P cashless service selection application launcher NFC chip. For example, the processor of the mobile device 120 may receive the preprogrammed identification of the P2P cashless service selection application 140 when the NFC chip of the mobile device 120 is brought to the proximity of the P2P cashless service selection application launcher NFC chip 130.

The NFC chip 130 may modulate the preprogrammed identification of the P2P cashless service selection application 140 in a magnetic field and inductively couple this magnetic field to the mobile device's NFC chip. The identification of the P2P cashless service selection application 140, in some embodiments, may be a URL address that may be used by the mobile device to launch the preprogrammed identification of the P2P cashless service selection application 140.

Through the NFC chip of the mobile device, the identification of a set of P2P cashless payment applications associated with the payee may be received (at block 1315). For example, the mobile device 120 of FIGS. 10 and 11 may receive the identification of the P2P cashless payment applications 121-124, to which the payee is subscribed. Since different payees may be subscribed to different P2P cashless payment applications, the P2P cashless service selection application launcher 130 associated which each particular payee may be preprogrammed with the P2P cashless payment applications 121-124, to which the particular payee is subscribed.

With continued reference to FIG. 13, the P2P cashless service selection application may be launched (at block 1320). For example, the processor of the mobile device 120 of FIGS. 10 and 11 may launch the P2P cashless service selection application 140. Next, the payee's identification may be displayed (at block 1325) on the display of the mobile device. For example, the P2P cashless service selection application 140 may display the payee's picture 126, the payee's user identification 127, the payee's first and/or family name 1020, etc., on the display 1010 of the mobile device 120, as shown in FIGS. 10 and 11.

The identification of the set of P2P cashless payment applications associated with the payee may be displayed (at block 1330) on the display of the mobile device. For example, the identification of the set of P2P cashless payment applications 121-124 may be displayed on the display 1010 of the mobile device 120, as shown in FIGS. 10 and 11.

Next, a selection of one of the P2P cashless payment applications associated with the payee may be received (at block 1335). For example, the processor of the mobile device 120 may receive the selection of the P2P cashless payment application 123, as shown in FIGS. 10-11 and in stage 1201 of FIG. 12.

The selected P2P cashless payment application may then be launched (at block 1340). For example, the processor of the mobile device 120 may launch the selected P2P cashless payment application 123, as shown in stage 1202 of FIG. 12.

With further reference to FIG. 13, the payee's identification may be passed (at block 1345) to the selected P2P cashless payment application in order for the selected P2P cashless payment application to initiate a P2P cashless payment transfer from the payor to the payee. For example, the P2P cashless payment application may receive and display the payee's identification as described above with reference to FIGS. 7 and 12. The process 1300 may then end.

The specific operations of the process 1300 may not be performed in the exact order shown and described. Furthermore, the specific operations described with reference to FIG. 13 may not be performed in one continuous series of operations, in some aspects of the present disclosure, and different specific operations may be performed in different embodiments.

For instance, in some aspects of the present embodiments, the operations at block 1305, 1310, and 1315 may be performed in a different order. In other embodiments, two or all of the operations at block 1305, 1310, and 1315 may be performed simultaneously. For example, one or more of the identification of the payee, the identification of the P2P cashless service selection application, and the identification of the set of P2P cashless payment application may be received in the same modulated signal at the NFC of the mobile device 605 from the NFC chip of the device 600 (FIG. 6). Furthermore, the operations at blocks 1325 and 1330, in some embodiments, may be performed simultaneously or in the operation at blocks 1330 may be performed before the operation at block 13300.

Figure 14:
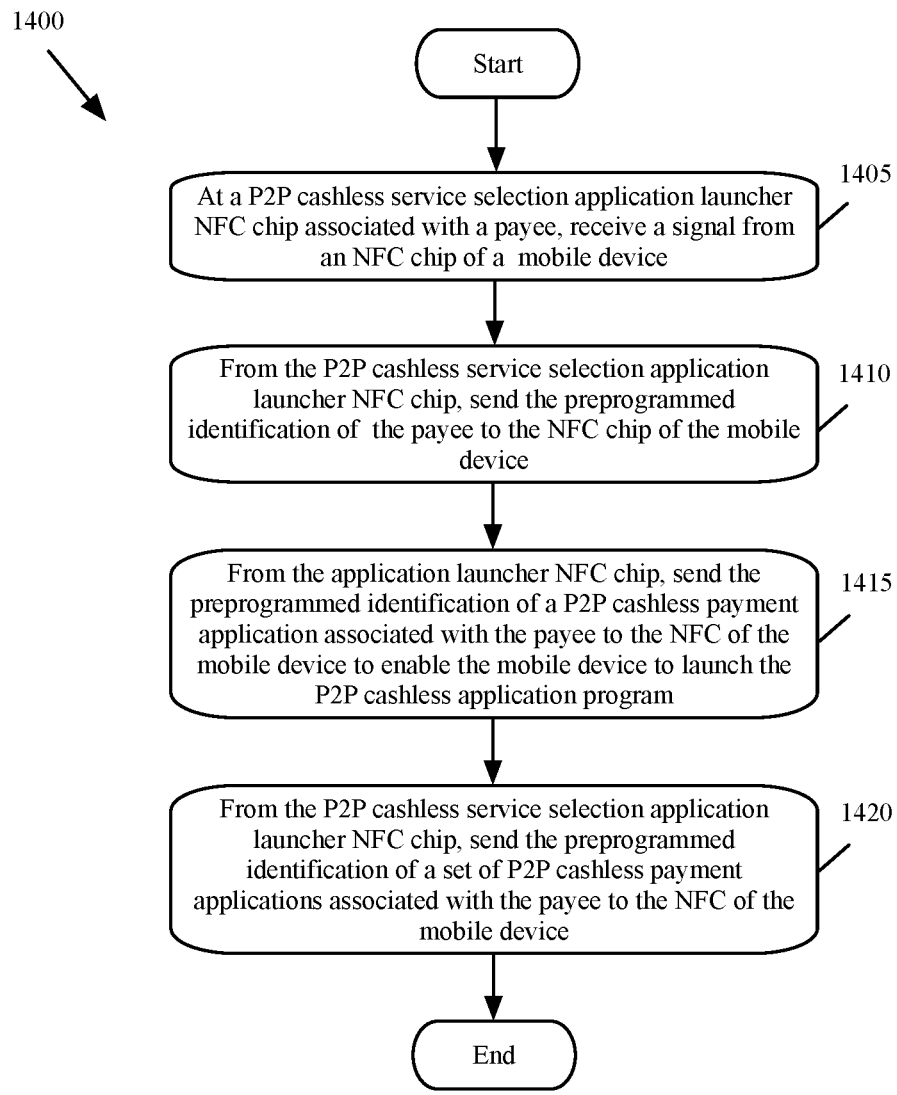
FIG. 14 is a flowchart illustrating an example process for a P2P service selection application launcher NFC chip to send the identification of a payee, the identification of a P2P service selection application launcher, and the identification of a set of P2P cashless payment applications associated with the payee to a mobile device, according to various aspects of the present disclosure.

FIG. 14 is a flowchart illustrating an example process 1400 for a P2P service selection application launcher NFC chip to send the identification of a payee, the identification of a P2P service selection application launcher, and the identification of a set of P2P cashless payment applications associated with the payee to a mobile device, according to various aspects of the present disclosure. The process 1400, in some of the present embodiments, may be performed by an NFC application launcher chip, such as any of the P2P service selection application launcher NFC chip 130 of FIGS. 1A, 1C, or 10-11.

With reference to FIG. 14, at a P2P service selection application launcher NFC chip, a signal may be received (at block 1405) from an NFC chip of a mobile device. For example, the P2P service selection application launcher NFC chip 130 of FIGS. 1A, 1C, or 10-11 may receive a signal when the NFC chip of the mobile device 120 is brought to the proximity of the P2P service selection application launcher NFC chip 130. The NFC chip of the mobile device 120 may generate a magnetic field which may induce an electric current in the antenna of the NFC chip 130.

Next, the preprogrammed identification of the payee may be sent (at block 1410) from the P2P service selection application launcher NFC chip 130 to the NFC chip of the mobile device. For example, the P2P service selection application launcher NFC chip 130 may modulate the preprogrammed identification of the payee in a magnetic field and inductively couple this magnetic field to the NFC chip of the mobile device 120.

With further reference to FIG. 14, the preprogrammed identification of a P2P service selection application may be sent (at block 1415) from the P2P service selection application launcher NFC chip to the NFC of the mobile device to enable the mobile device to launch the application program. For example, the P2P service selection application launcher NFC chip 130 of may modulate the preprogrammed identification of the P2P service selection application launcher 125 in a magnetic field and inductively couple this magnetic field to the NFC chip of the mobile device 120.

With continued reference to FIG. 14, the preprogrammed identification of a set of P2P cashless payment applications associated with the payee may be sent (at block 1420) from the P2P service selection application launcher NFC chip to the NFC of the mobile device to enable the mobile device to launch the application program. For example, the P2P service selection application launcher NFC chip 130 of may modulate the preprogrammed identification of the P2P cashless payment applications 121-124 of FIG. 1C in a magnetic field and inductively couple this magnetic field to the NFC chip of the mobile device 120. The process 1400 may then end.

The specific operations of the process 1400 may not be performed in the exact order shown and described. Furthermore, the specific operations described with reference to FIG. 14 may not be performed in one continuous series of operations, in some aspects of the present disclosure, and different specific operations may be performed in different embodiments.

For instance, in some aspects of the present embodiments, the operations at blocks 1410-1420 may be performed at a different order. In other embodiments, two or all of the operations at blocks 1410-1420 may be performed simultaneously. For example, the identification of the payee, the identification of the P2P service selection application launcher, and the identification of set of the P2P cashless payment applications may be sent from the P2P service selection application launcher NFC chip 130 to the NFC of the mobile device 120 in the same signal.

The P2P cashless payment application launcher NFC chips 125 may be preprogrammed to include the identification of the payee and the identification of the corresponding P2P cashless payment application. Similarly, the P2P service selection application launcher NFC chip 130 may be preprogrammed to include the identification of the payee, the identification of the P2P service selection application, and the identification of the set of P2P cashless payment applications associated with the payee.

Figure 15:
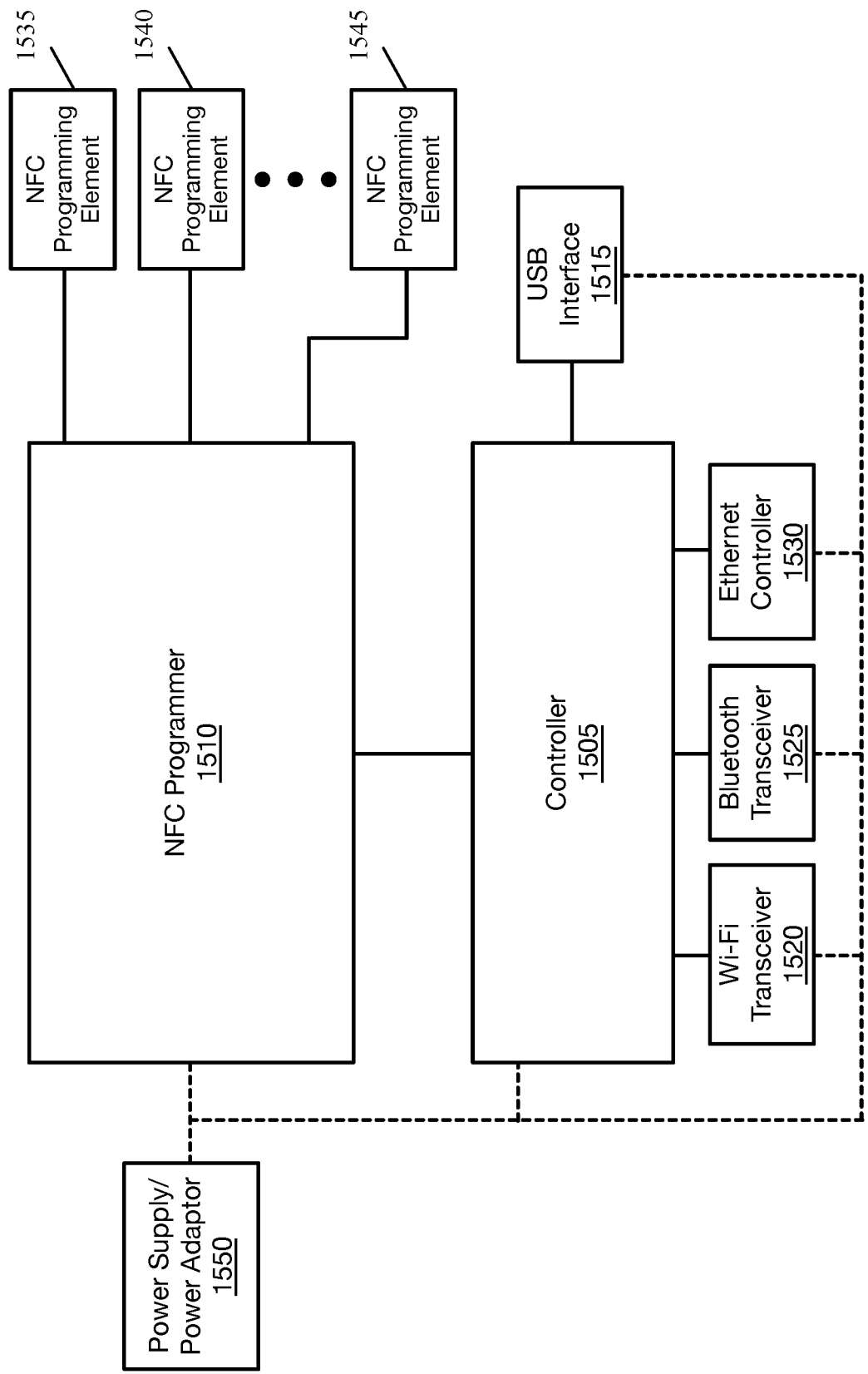
FIG. 15 is a functional block diagram illustrating an example system for programming a device for launching multiple P2P cashless payment applications, according to various aspects of the present disclosure.

FIG. 15 is a functional block diagram illustrating an example system 1500 for programming a device for launching multiple P2P cashless payment applications, according to various aspects of the present disclosure. With reference to FIG. 15, the system 1500 may include a controller 1505, an NFC programmer 1510, several NFC programming elements 1535-1545, and a power supply or a power adaptor 1505.

The system 1500 may have one or more of the Wi-Fi transceivers 1520, Bluetooth transceiver 1525, the Ethernet controller 1530, and/or the USB interface 1515 for receiving data (e.g., the profile information of a person such as the person 110 of FIG. 1A or the person 290 of FIG. 2). The system 1500 may be implemented on a circuit board. The circuit board may have a shape similar to the P2P cashless payment application launcher device to be programmed. For example, if the P2P cashless payment application launcher device is in the shape of the hexagon 400 of FIG. 4, the circuit board of the system 1500 may substantially be in the shape of a hexagon to receive the device 400.

The location of the NFC programming elements 1535-1545 may be such that each NFC programming elements 1535-1545 may come to contact (or be in the proximity of) a corresponding NFC chip 401-408 of the device 400. The controller may receive the user's profile information through one of the interfaces 1515-1530 and may send the information to the NFC programmer 1510.

The controller may be connected to a display (not shown) or may be controlled remotely by an electronic device such as, without limitation, a mobile device. The NFC programmer 1510 may program each of the NFC chips 401-408 of the device 400 through a corresponding NFC programming element 1535-1545.

FIG. 16 is a schematic front view of an example user interface of a system for programming a device for launching multiple P2P cashless payment applications, according to various aspects of the present disclosure. FIG. 16, as shown, includes four operational stages 1601-1604. In the embodiment shown in FIG. 16, the user interface may be displayed on the display 1681 of a mobile device 1682 that is used to remotely control the programming system 1500 of FIG. 15. Alternatively, the user interface may be displayed on a display device (such as a monitor) connected to the controller 1505 of FIG. 15.

In stage 1601, the display may provide areas 1605-1620 for entering the user profile's information. The user profile's information may include, without limitation, one or more of a photo 1665 of the user, the first name 1605, the family name 1610, the address 1615, the email 1620, etc. The user interface may provide an option 1625 to select the cashless payment applications to which the user is subscribed. In alternative embodiments, the user may have to subscribe to all cashless payment applications for which a corresponding NFC chip is included in the device being programmed. In these embodiments, the user interface may not display option 1625 and stage 1603 may be skipped.

With further reference to FIG. 16, the user interface may receive input through a keyboard 710 displayed on the display 1681. As shown by 1630, the user's profile information may be entered, for example, where a cursor 1670 is located. In stage 1602, the user's profile information is entered and the user interface may receive a selection of the option 1625.

In stage 1603, several P2P cashless payment applications 1640 may be displayed. Additional P2P cashless payment applications may be displayed by using the scroll tool 1645. As shown in stage 1603, one of the P2P cashless payment applications 1640 to which the user is subscribed may be selected and the option 1650 is selected.

In stage 1604, the cashless payment applications 1655 to which the user is subscribed are displayed. Two options 1625 and 1660 are provided to further edit the subscribed cashless payment application or to program the NFC chips, respectively. When a selection of the option 1660 is selected, the NFC chips on the P2P cashless payment application launcher device may be programmed through the NFC programming elements 1535-1545 of FIG. 15.

Figure 17:
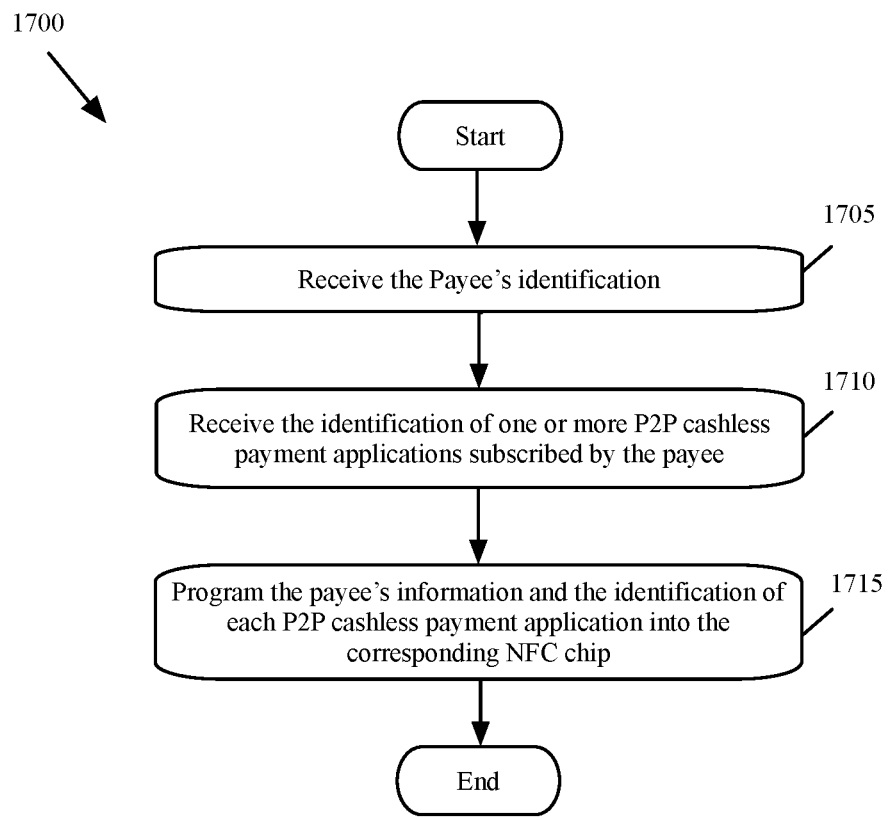
FIG. 17 is a flowchart illustrating an example process for programming the P2P cashless payment application launcher NFC chips, according to various aspects of the present disclosure.

FIG. 17 is a flowchart illustrating an example process 1700 for programming the P2P cashless payment application launcher NFC chips, according to various aspects of the present disclosure. The process 1700, in some of the present embodiments, may be performed by a processor of a controller, such as the controller 1505 of FIG. 15.

With reference to FIG. 17, the payee's identification may be received (at block 1705). For example, the payee's identification may be received as described above with reference to stage 1602 of FIG. 16. With further reference to FIG. 17, the identification of one or more P2P cashless service selection applications associated with the payee may be received (at block 1710). For example, the identification of the P2P cashless service selection applications associated with the payee may be received as described above with reference to stage 1603 of FIG. 16.

Next, the payee's information and the identification of each P2P cashless payment application may be programmed (at block 1715) into the corresponding P2P cashless payment application launcher NFC chip. For example, each P2P cashless payment application launcher NFC chip may be programmed as described above with reference to FIG. 15 and FIG. 16 stage 1604. The process 1700 may then end.

The specific operations of the process 1700 may not be performed in the exact order shown and described. Furthermore, the specific operations described with reference to FIG. 17 may not be performed in one continuous series of operations, in some aspects of the present disclosure, and different specific operations may be performed in different embodiments. For instance, in some aspects of the present embodiments, the operations at blocks 1705-1710 may be performed at a different order.

Figure 18:
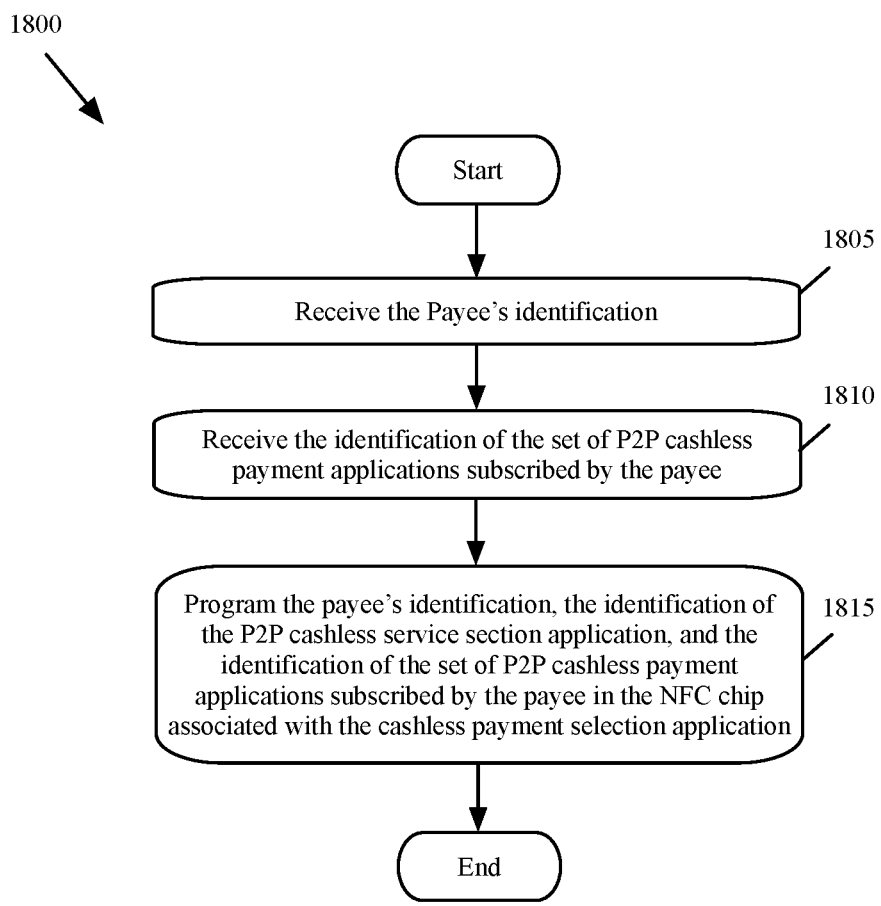
FIG. 18 is a flowchart illustrating an example process for programming the service selection application launcher NFC chips, according to various aspects of the present disclosure.

FIG. 18 is a flowchart illustrating an example process 1800 for programming the service selection application launcher NFC chips, according to various aspects of the present disclosure. The process 1800, in some of the present embodiments, may be performed by a processor of a controller, such as the controller 1505 of FIG. 15.

With reference to FIG. 18, the payee's identification may be received (at block 1805). For example, the payee's identification may be received as described above with reference to stage 1602 of FIG. 16. With further reference to FIG. 18, the identification of one or more P2P cashless service selection applications associated with the payee may be received (at block 1810). For example, the identification of the P2P cashless service selection applications associated with the payee may be received as described above with reference to stage 1603 of FIG. 16.

Next, the payee's information, the identification of the P2P cashless service selection application, and the identification of each P2P cashless payment application may be programmed (at block 1815) into the corresponding P2P cashless payment application launcher NFC chip. For example, each P2P cashless payment application launcher NFC chip may be programmed as described above with reference to FIG. 15 and FIG. 16 stage 1604. Since the P2P cashless service selection application identification is known, the identification of the P2P cashless service selection application may be stored in memory and may be retried from the memory (instead of being received through the user interface of FIG. 16). The process 1800 may then end.

The specific operations of the process 1800 may not be performed in the exact order shown and described. Furthermore, the specific operations described with reference to FIG. 18 may not be performed in one continuous series of operations, in some aspects of the present disclosure, and different specific operations may be performed in different embodiments. For instance, in some aspects of the present embodiments, the operations at blocks 1805-1810 may be performed at a different order.

The NFC chip(s) of a multiple P2P cashless payment applications launcher device, in some embodiments, may be programmed by a payee who may have obtained a multiple P2P cashless payment applications launcher device, such as, for example, and without limitations, the multiple P2P cashless payment applications launcher devices 115 (FIGS. 1A-1D), 216-219 (FIG. 2), 220 (FIGS. 2 and 5A-5B), 301-303 (FIGS. 3A-3C), 400 (FIG. 4), 600 (FIG. 6), 1000 (FIG. 10), 1105 (FIG. 11), etc., that may include one or more NFC chips.

Figure 19:
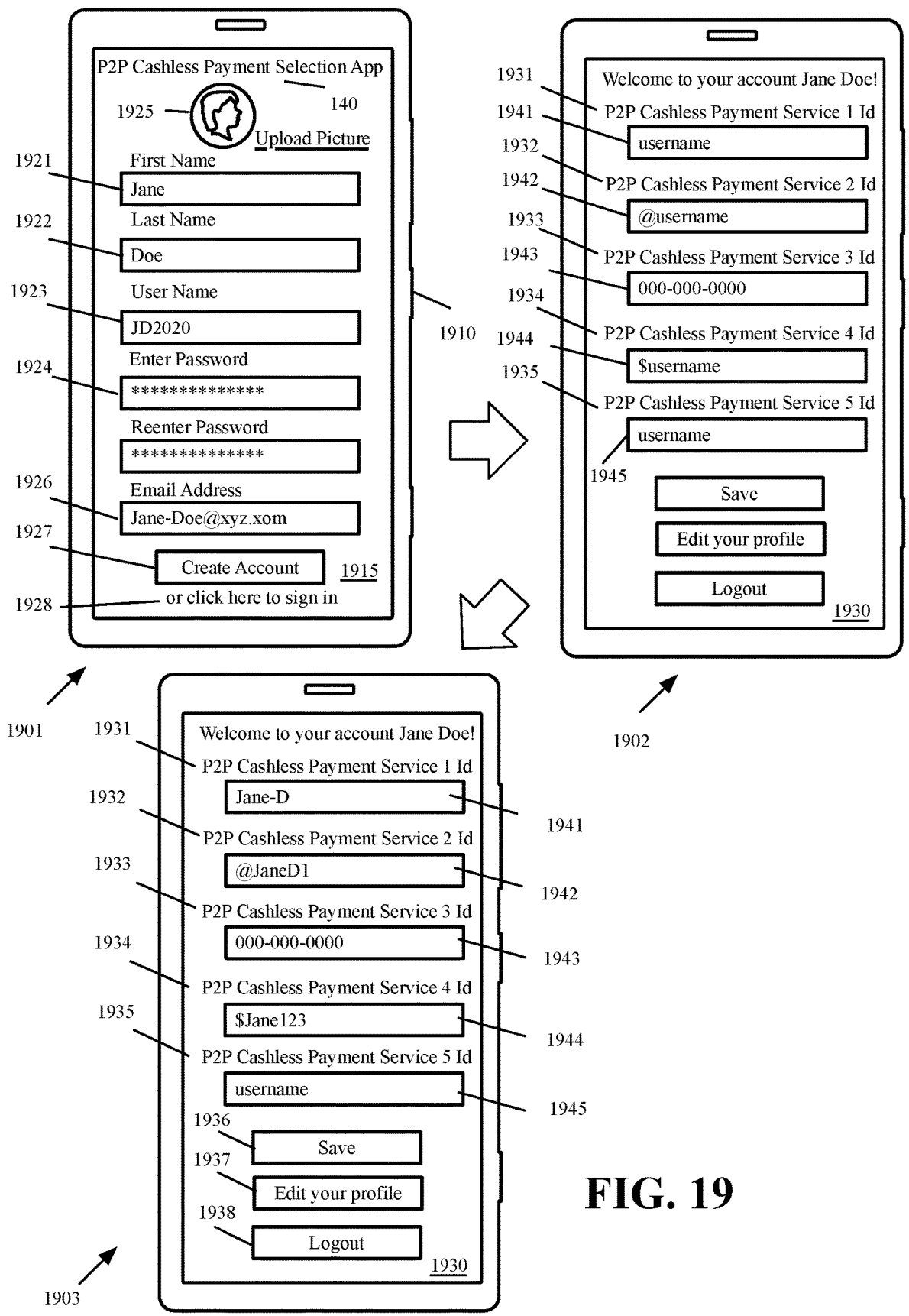
FIG. 19 is a schematic front view of a user interface of a system for registering a payee and establishing a profile for using a P2P cashless service selection application, according to various aspects of the present disclosure.

FIG. 19 is a schematic front view of an example user interface of a system for registering a payee and establishing a profile for using a P2P cashless service selection application, according to various aspects of the present disclosure. FIG. 19, as shown, includes three operational stages 1901-1902. With reference to FIG. 19, the electronic device 1910 may be any computing device with the Internet connection capability. For example, and without limitations, the electronic device 1910 may be a mobile device (such as a cellular phone, a tablet, or a laptop) or a desktop computing device.

As shown in stage 1901, a payee has connected to a web page 1915 associated with the P2P cashless service selection application 140 in order to create an account. The payee may then enter the payee's identification, such as, for example, and without limitations, first name 1921, last name 1922, a user name 1923, a password 1924, a picture 1925, and/or an email 1926.

The payee may then select the option 1927 to create an account. The payee may then use the option 1928 in subsequent visits to the web page of the P2P cashless service selection application 140 to log in. In stage 1902, the payee may navigate to a web page 1930 to generate a profile. As shown, the payee may be prompted to enter the identifications that the payee uses for several different P2P cashless payment applications 1931-1935. The suggested format of a user identification for each of the P2P cashless payment applications 1931-1935 may be provided in a corresponding data entry field 1941-1945. The P2P cashless payment applications are third party applications that are independent of the P2P cashless service selection application 140 of the present embodiments.

As shown in stage 1903, the payee may have entered the user identifications 1941, 1942, and 1944 that the payee uses for accessing the P2P cashless payment services 1931, 1932, and 1934, respectively. In the example of FIG. 19, the payee may not have entered the payee's identification for the P2P cashless payment services 1933 and 1935 (e.g., the payee may not have established an account with these P2P cashless payment services or may not want to use them with a multiple P2P cashless payment applications launcher device of the present embodiments. The payee may then select one of the options 1936, 1937, and 1938 to save the profile, edit the profile, or logout, respectively.

Figure 20:
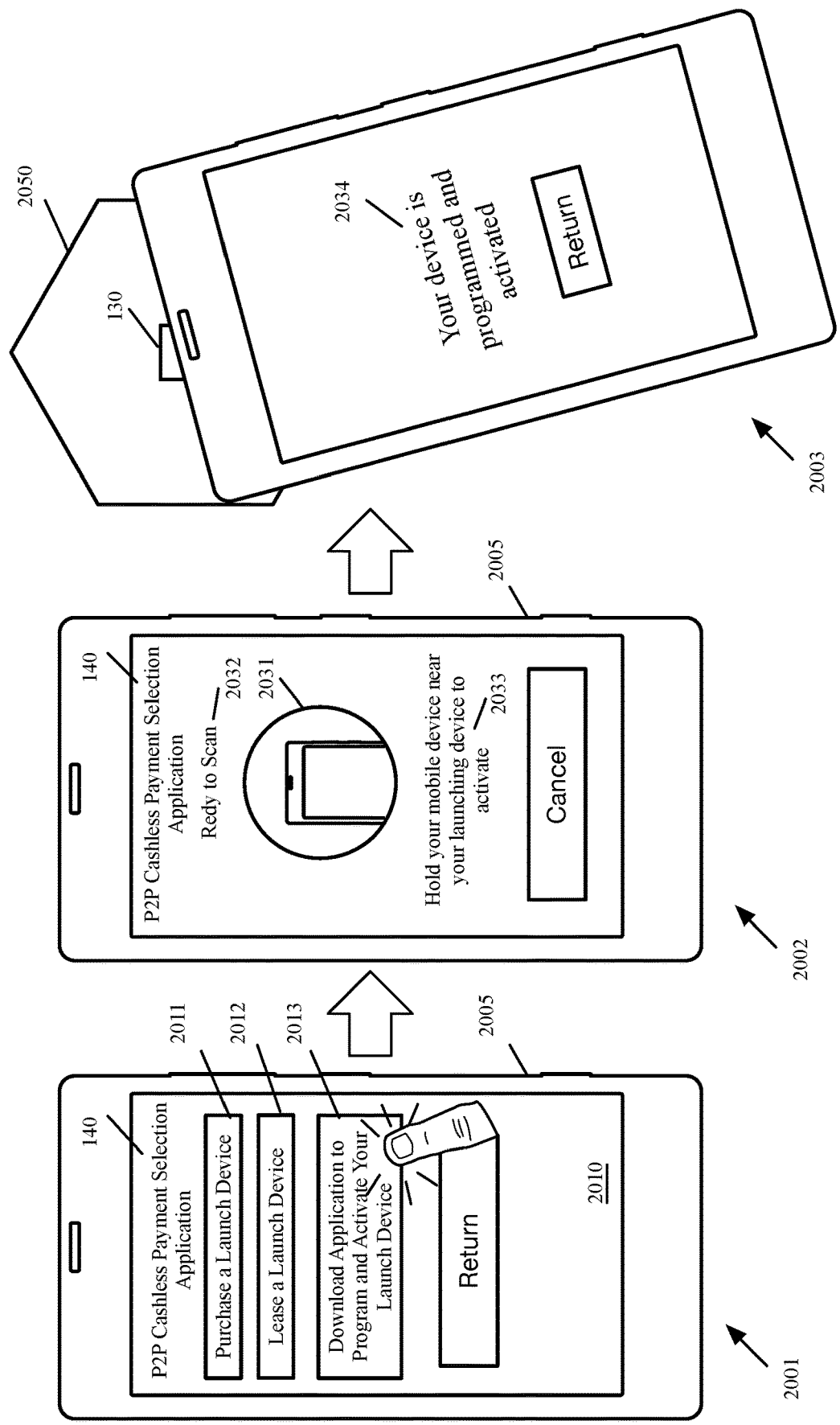
FIG. 20 is a functional diagram illustrating an example embodiment of a system for programming and activating a multiple P2P cashless payment applications launcher device, according to various aspects of the present disclosure.

Once a payee has registered, the payee may purchase of rent a multiple P2P cashless payment applications launcher device. FIG. 20 is a functional diagram illustrating an example embodiment of a system for programming and activating a multiple P2P cashless payment applications launcher device, according to various aspects of the present disclosure. FIG. 20, as shown, has three operational stages 2001-2003. In stage 2001, a payee may have used a mobile device 2005 to access a web page 2010 associated with the P2P cashless service selection application 140 of the present embodiments.

In the example of FIG. 20, the payee may have previously obtained (e.g., purchased or rented) a multiple P2P cashless payment applications launcher device 2050 by selecting one of the options 2011 or 2012. In the example of FIG. 20, the payee may select the option 2013 to program the NFC chip(s) of and activate the multiple P2P cashless payment applications launcher device 2050. In the example of FIG. 20, the multiple P2P cashless payment applications launcher device 2050 only has the P2P service selection application launcher NFC chip 130.

As shown in stage 2002, in response to selecting the option 2013, the P2P cashless service selection application 140 may display an icon 2031 and/or a message 2032 to indicate the application program required to program an activate the multiple P2P cashless payment applications launcher device 2050 has been successfully downloaded into the mobile device 2005. The application program that is downloaded into the mobile device 2005 may include the payee's personalized profile information, for example as entered by the payee in stages 1901 and 1903 of FIG. 19. For example, and without limitation, the downloaded application program may include the payee's identifications 1921-1926, the identification of the P2P cashless payment applications 1931, 1932, and 1934 that are used and/or subscribed by the payee, and the payee's corresponding user identifications 2141, 1942, and 1944 for the P2P cashless payment applications 1931, 1932, and 1934.

In stage 2002, a message 2033 may be displayed to on the display 2040 of the mobile device 2005 to instruct holding the mobile device near the multiple P2P cashless payment applications launcher device 2050.

As shown in stage 2003, in response to the message 2033, the mobile device 2005 may be brought near the multiple P2P cashless payment applications launcher device 2050 and the NFC chip 130, resulting in the application program that was downloaded into the mobile device in stage 2002 to program the NFC chip 130 using the NFC communication protocol. When the NFC chip 130 is successfully programmed, a message 2034 may be displayed indicating that the multiple P2P cashless payment applications launcher device 2050 has been programmed and activated.

Figure 21:
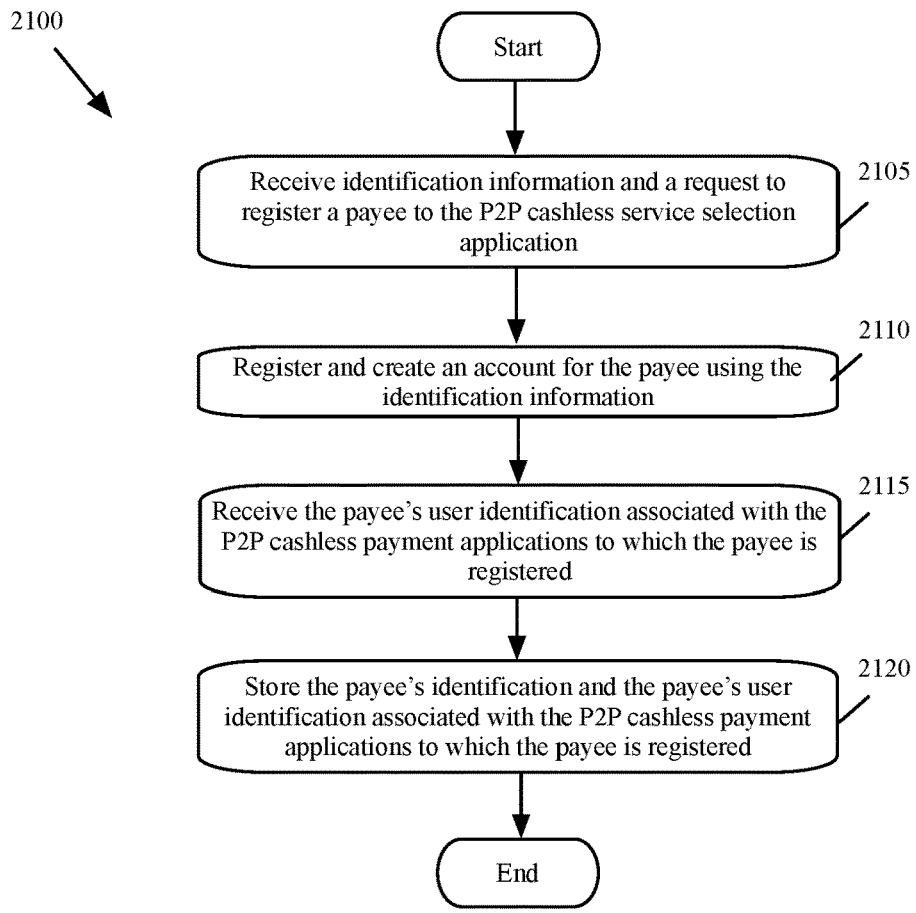
FIG. 21 is a flowchart illustrating an example process for creating a profile for a payee, according to various aspects of the present disclosure.

FIG. 21 is a flowchart illustrating an example process 2100 for creating a profile for a payee, according to various aspects of the present disclosure. The process 2100, in some of the present embodiments, may be performed by a processor of a web server that may create and manage the payees' profile.

With reference to FIG. 21, the identification information of a payee and a request to register the payee to the P2P cashless service selection application may be received (at block 2105). For example, the identification information of the payee and the request to register may be received as described above with reference to stage 1901 of FIG. 19. Next, the payee may be registered and an account for the payee may be created (at block 2110) using the identification information. For example, the payee may be registered and an account may be created after the option 1927 is selected in stage 1901 of FIG. 19.

Next, the payee's user identification associated with the P2P cashless payment applications to which the payee is registered may be received (at block 2115). For example, the payee's user identifications 1941, 1942, and 1944 for the P2P cashless payment applications 1931, 1932, and 1934 to which the payee is registered may be received as described above with reference to stage 1903 of FIG. 19.

The payee's identification and the payee's user identification associated with the P2P cashless payment applications to which the payee is registered may then be stored (at block 2120). The process 2100 may then end.

Figure 22:
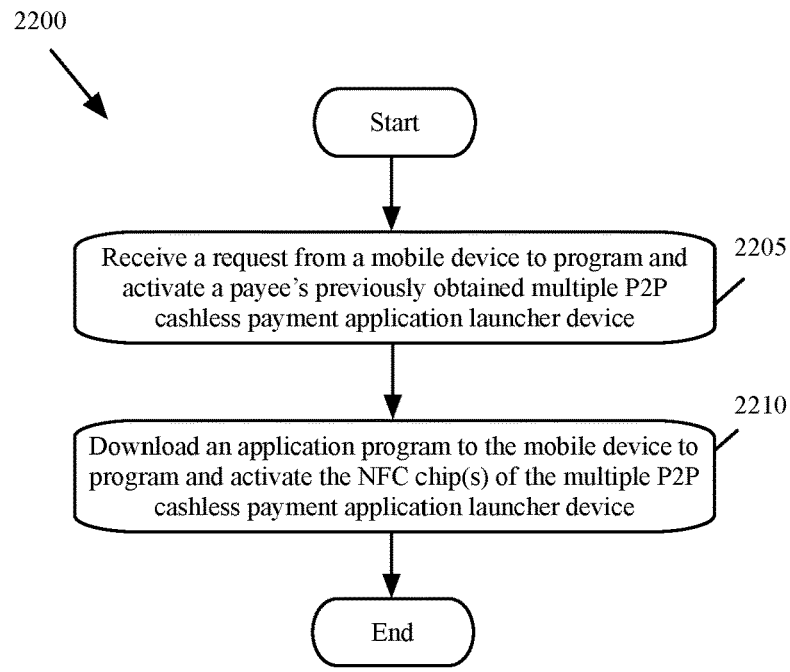
FIG. 22 is a flowchart illustrating an example process for downloading an application program to program and activate a multiple P2P cashless payment applications launcher device, according to various aspects of the present disclosure.

FIG. 22 is a flowchart illustrating an example process 2200 for downloading an application program to program and activate a multiple P2P cashless payment applications launcher device, according to various aspects of the present disclosure. The process 2200, in some of the present embodiments, may be performed by a processor of a web server that may create and manage the payees' profiles.

With reference to FIG. 22, a request may be received (at block 2205) from a mobile device to activate a payee's previously obtained multiple P2P cashless payment applications launcher device. For example, a request may be received to activate a payee's previously obtained multiple P2P cashless payment applications launcher device when the option 2014 is selected in stage 2001 of FIG. 20.

Next, an application program may be downloaded (at block 2210) to the mobile device to program and activate the NFC chip(s) of the P2P cashless payment applications launcher device. For example, an application may be downloaded to the mobile device 2005 to program and activate the NFC chip(s) 130 of the P2P cashless payment applications launcher device 2050, as described above with reference to stage 2002 of FIG. 20. The process 2200 may then end.

Figure 23:
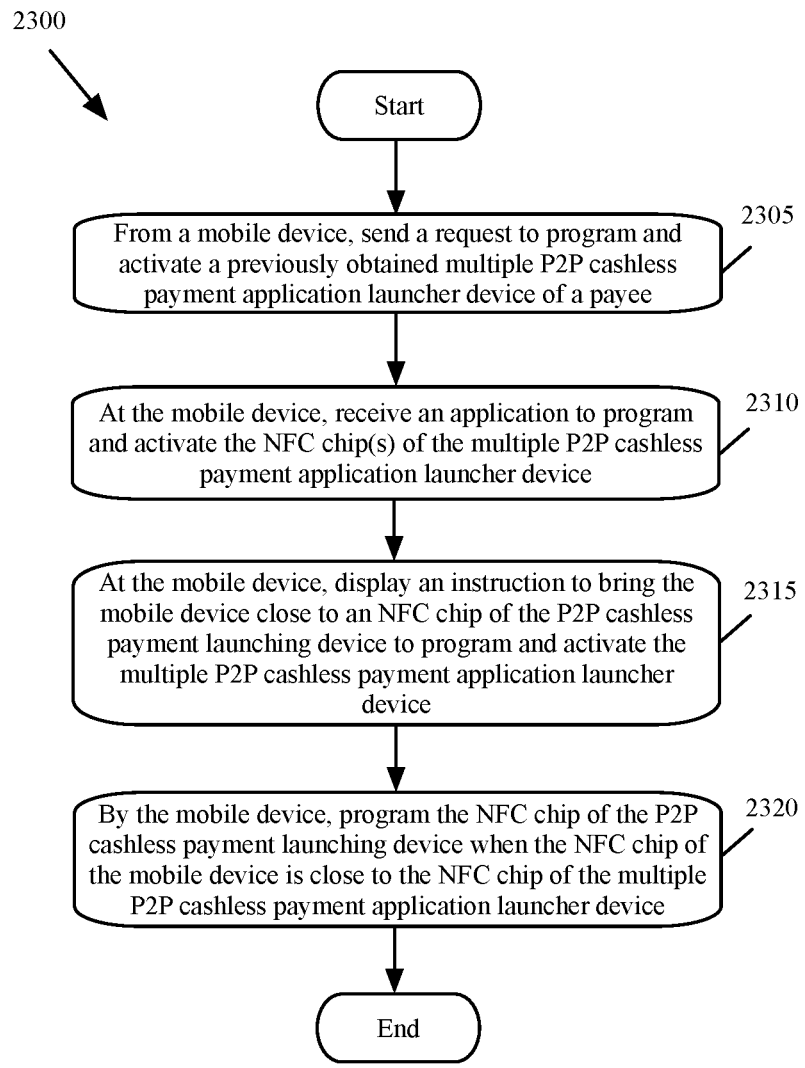
FIG. 23 is a flowchart illustrating an example process for programming and activating the NFC chip(s) of a multiple P2P cashless payment applications launcher device, according to various aspects of the present disclosure.

FIG. 23 is a flowchart illustrating an example process 2300 for programming and activating the NFC chip(s) of a multiple P2P cashless payment applications launcher device, according to various aspects of the present disclosure. The process 2300, in some of the present embodiments, may be performed by a processor of a mobile device such as the mobile device 2005 of FIG. 20.

With reference to FIG. 22, a request may be sent (at block 2305) from a mobile device to program and activate a previously obtained multiple P2P cashless payment applications launcher device of a payee. For example, the mobile device 2005 may send a request to program and activate a previously obtained P2P cashless payment applications launcher device of a payee when the option 2013 is selected in stage 2001 of FIG. 20.

Next, an application to program and activate the NFC chip(s) of the P2P cashless payment applications launcher device may be received (at block 2310) at the mobile device. For example, the mobile device 2005 may receive an application to program and activate the NFC chip 130 of the multiple P2P cashless payment applications launcher device 2050, as described above with reference to stage 2002 of FIG. 20.

Next, an instruction may be displayed (at block 2315) at the mobile device to bring the mobile device close to an NFC chip of the multiple P2P cashless payment applications launcher device to program and activate the application launcher device. For example, the message 2033 may be displayed on the mobile device 2005, as shown in stage 2002 of FIG. 20.

Next, the mobile device may program (at block 2320) the NFC chip of the multiple P2P cashless payment applications launcher device when the NFC chip of the mobile device is close to the NFC chip of the multiple P2P cashless payment applications launcher device. For example, the mobile device 2005 may program the NFC chip 130 of the multiple P2P cashless payment applications launcher device 2050, as described with reference to stage 2003 of FIG. 20. The process 2300 may then end.

In some aspects of the present embodiment, the programming system may, in addition to, or in lieu of programming NFC chips, generate a matrix barcode such as a quick response (QR) code that may be scanned by a mobile device to launch a multiple P2P cashless service selection application such as the multiple P2P cashless service selection application 1015 described above with reference to FIGS. 10 and 12. In some aspects of the present embodiment, the programming system may further generate several matrix barcodes such QR code, where each QR code may be scanned by a mobile device to launch a corresponding P2P cashless payment application, such as the P2P cashless payment application 660 of FIGS. 6 and 7.

FIG. 24 is a schematic front view of an example user interface of a system for generating one or more QR codes for launching multiple P2P cashless payment applications, according to various aspects of the present disclosure. FIG. 24, as shown, includes four operational stages 2401-2404. Stages 2401-2403 are similar to stages 1601-1603 of FIG. 16, respectively.

In stage 2404 of FIG. 24, an option 2410 is provided for generating QR codes for launching the P2P cashless payment services selected in stage 243. Some of the present embodiments may generate one QR code that may be scanned by a mobile device to launch a P2P cashless service selection application, such as the P2P cashless service selection application 1060 of FIGS. 10 and 12.

Figure 25:
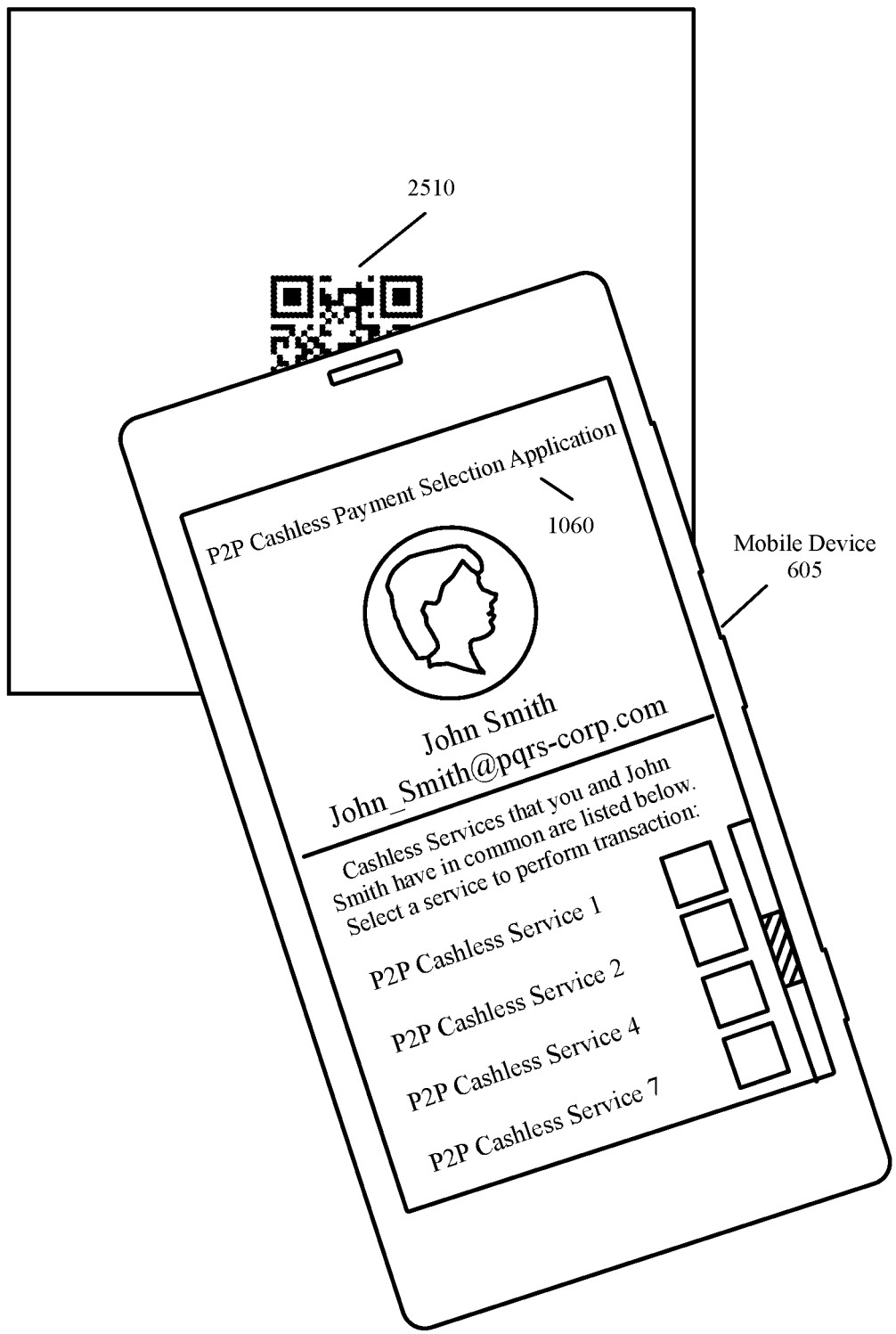
FIG. 25 is a functional diagram illustrating an example embodiment of a system for using a QR code for launching an application program for providing multiple P2P cashless payment applications, according to various aspects of the present disclosure.

FIG. 25 is a functional diagram illustrating an example embodiment of a system for launching a P2P cashless service selection application on a mobile device using a QR code, according to various aspects of the present disclosure. With reference to FIG. 25, the multiple cashless payment application launcher device 2500 may include a QR code 2510.

The mobile device 605 may include a bar code scanner (not shown). When the mobile device is brought to the proximity of the P2P cashless service selection application launcher 2510, the corresponding P2P cashless service selection application 1060 may be launched on the mobile phone 605. The P2P cashless service selection application 1060 may operate as described above with reference to FIGS. 10-12. The QR codes may also be used to directly launch one of several P2P cashless payment applications similar to launching the P2P cashless payment applications by the NFC chips described above.

In some of the present embodiments, the P2P cashless payment selection application 140 may provide a dashboard for the payees to show the payees activities and balances with different multiple P2P cashless payment applications. For example, a payee may register to and create a portfolio with the P2P cashless payment selection application 140 (as above described above with reference to FIG. 19). The payee may purchase, or rent, or be assigned a multiple P2P cashless payment applications launcher device and may program the multiple P2P cashless payment applications launcher device (as described above with reference to FIG. 20). The multiple P2P cashless payment applications launcher device may be used by payors to make payments to the payee from different payors through different P2P cashless payment applications (as described above with reference to FIGS. 1B and 1D).

FIG. 26 is a schematic front view of an example user interface 2605 of the P2P cashless payment selection application for providing reports of a payee's activities, according to various aspects of the present disclosure. With reference to FIG. 26, the user interface 2605 may be displayed on the display of an electronic device after the payee logs in the P2P cashless payment selection application 140 using the electronic device. For example, and without limitations, the electronic device may be a mobile device (such as a cellular phone, a tablet, or a laptop) or a desktop computing device.

The user interface 2605 may display several options 2621-2623 for generating reports of the payee's activities. In this example, the option 2621 to show daily activity is selected. As shown, in response to the selection of option 2621, the user interface 2605 may provide a dashboard 2650 and may display the P2P cashless payment applications 2611-2616, to which the payee is subscribed. More cashless payment applications may be displayed, for example, by using the scroll tool 2670. It should be noted that different payees may be subscribed to different P2P cashless payment applications.

With further reference to FIG. 26, the P2P cashless payment selection application 140 may connect to each of the P2P cashless payment applications 2611-2616 using a corresponding application programming interface (API). In some embodiments, the payee should authorize each P2P cashless payment application 2611-2616 to provide the payee's transactions to the P2P cashless payment selection application 140.

The dashboard 2650 may provide the names 2610 of each P2P cashless payment application 2611-2616, the total amount 2620 received by the payee through each P2P cashless payment application, the amount that is sent 2625 out of from each P2P cashless payment application (e.g., the amounts that the payee has transferred to the payee's bank account, has used to purchase items, has used to pay others, etc.), and the remaining balance 2630 in each P2P cashless payment application 2611-2616. The user interface 2605 may combine, through the corresponding APIs, all P2P cashless payment application activities of a payee into one dashboard 2650, allowing the payee to access the accounting in one location instead of having to individually access each P2P cashless payment application accounts separately.

The programmer devices, the mobile devices, the web servers, the NFC chips, the controllers, etc., described above (collectively referred to herein as the electronic devices), may include memory. The memory may be one or more units of similar or different memories. For example, the electronic devices' memory may include, without any limitations, random access memory (RAM), read-only-memory (ROM), read-only compact discs (CD-ROM), erasable programmable read-only memories (EPROMs), electrically erasable programmable read-only memories (EEPROMs), flash memory (e.g., secured digital (SD) cards, mini-SD cards, micro-SD cards, etc.), magnetic and/or solid state hard drives, ultra-density optical discs, any other optical or magnetic media, and floppy disks.

The electronic devices, such as, for example, and without imitations, the programmer devices, the mobile devices, the web servers, the controllers, etc., described above may include one or more processing units. For example, the processing unit(s) in above examples may be single-core processor(s) or multi-core processor(s) in different embodiments. The electronic devices in some of the present embodiments may store computer program instructions in the memory, which may be a machine-readable or computer-readable medium (alternatively referred to as computer-readable storage medium, machine-readable medium, or machine-readable storage medium).

Many of the above-described features and applications may be implemented as software processes (or programs) that are specified as a set of instructions recorded on a computer readable storage medium. The computer-readable medium may store a program that is executable by at least one processing unit and includes sets of instructions for performing various operations. Examples of programs or computer code include machine code, such as is produced by a compiler, and files including higher-level code that are executed by a computer, an electronic component, or a microprocessor using an interpreter. From these various memory units, the processing unit may retrieve instructions to execute and data to process in order to execute the processes of the present embodiments.

As used in this disclosure and any claims of this disclosure, the terms such as "processing unit," "processor," "controller," "microcontroller," "server", and "memory" all refer to electronic or other technological devices. These terms exclude people or groups of people. For the purposes of this disclosure, the terms display or displaying means displaying on an electronic device. As used in this disclosure and any claims of this disclosure, the terms "computer readable medium," "computer readable media," and "machine readable medium" are entirely restricted to tangible, non-transitory, physical objects that store information in a form that is readable by a processing unit. These terms exclude any wireless signals, wired download signals, and any other transitory and ephemeral signals. As used in this disclosure and any claims of this disclosure, the term application is referred to an application program (or a program) that performs a set of tasks.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method, comprising:

bringing a near field communication (NFC) chip of a mobile device of a payor to a proximity of an NFC chip of a multiple peer to peer (P2P) cashless payment applications launcher device of a payee, the NFC chip of the multiple P2P cashless payment applications launcher device of the payee storing a set of one or more identifications of the payee, an identification of a P2P cashless service selection application, and identifications of a plurality of P2P cashless payment applications to which the payee is subscribed;

transferring, in response to bringing the NFC chip of the mobile device of the payor to the proximity of the NFC chip of the multiple P2P cashless payment applications launcher device of the payee, the set of identifications of the payee, the identification of the P2P cashless service selection application, and the identifications of the plurality of P2P cashless payment applications to which the payee is subscribed, by the NFC chip of the multiple P2P cashless payment applications launcher device, to the NFC chip of the mobile device; and by a processor of the mobile device of the payor:

receiving, from the NFC chip of the mobile device, the set of identifications of the payee, the identification of the P2P cashless service selection application, and the identifications of the plurality of P2P cashless payment applications to which the payee is subscribed;

launching the P2P cashless service selection application;

displaying, on a display of the mobile device of the payor, a set of selection options at a user interface of the P2P cashless service selection application, each selection option selecting a corresponding P2P cashless payment application in the plurality of P2P cashless payment applications to which the payee is subscribed;

receiving, through the user interface of the P2P cashless service selection application, a selection of an option corresponding to a P2P cashless payment application to which the payee is subscribed;

launching the selected P2P cashless payment application to which the payee is subscribed; and sending at least one identification of the payee, in the set of identifications of the payee, to the launched P2P cashless payment application to which the payee is subscribed.

2. The method of claim 1, wherein the identification of the P2P cashless service selection application comprises a launching address of the P2P cashless service selection application.

3. The method of claim 1, wherein the identification of each P2P cashless payment application to which the payee is subscribed comprises a launching address of the corresponding P2P cashless payment application.

4. The method of claim 1, wherein the identification of each P2P cashless payment application to which the payee is subscribed comprises a launching address comprising one of a uniform resource identifier (URI) address and a uniform resource locator (URL) address.

5. The method of claim 1 further comprising:
displaying, by the processor of the mobile device, one or more identifications in the set of identifications of the payee comprising the payee's first name, the payee's last name, the payee's profile name, the payee's username, the payee's email, the payee's phone number, and an identification used by the payee when the payee registered with one or more of the P2P cashless payment applications to which the payee is subscribed.

6. The method of claim 1, wherein the NFC chip of the multiple P2P cashless payment applications launcher device of the payee is a first NFC chip, wherein the P2P cashless payment application to which the payee is subscribed is a first P2P cashless payment application to which the payee is subscribed, wherein the multiple P2P cashless payment applications launcher device of the payee further comprises a set of one or more NFC chips other than the first NFC chip, each NFC chip in the set of NFC chips storing a set of one or more identifications of the payee and an identification of a corresponding P2P cashless payment application to which the payee is subscribed, the method further comprising:

bringing the NFC chip of the mobile device of the payor to a proximity of an NFC chip in the set of NFC chips of the multiple P2P cashless payment applications launcher device of the payee;

transferring, in response to bringing the NFC chip of the mobile device of the payor to the proximity of said NFC chip in the set of NFC chips of the multiple P2P cashless payment applications launcher device of the payee, the set of identifications of the payee and the identification of a second P2P cashless payment application to which the payee is subscribed, to the NFC chip of the mobile device; and by the processor of the mobile device of the payor:
receiving, from the NFC chip of the mobile device, the set of identifications of the payee and the identification of the second P2P cashless payment application to which the payee is subscribed;

launching the second P2P cashless payment application to which the payee is subscribed; and sending at least one identification, in the set of identifications of the payee, to the second P2P cashless payment application to which the payee is subscribed.

7. The method of claim 1 further comprising, by the launched P2P cashless payment application, making a payment from the payor to the payee by one or more of transferring cash from a bank account of the payor to a bank account of the payee, transferring cash from an account of the payor within the launched P2P cashless payment application to an account of the payee within the launched P2P cashless payment application.

8. The method of claim 1 further comprising, by the launched P2P cashless payment application, making a payment from the payor to the payee by transferring a quantity of cryptocurrency comprising one of bitcoins and fiat currency from an account of the payor to an account of the payee.

* * * * *